United States Patent
Yoshida

(10) Patent No.: US 10,207,733 B2
(45) Date of Patent: **\*Feb. 19, 2019**

(54) ROTATIONAL ANGLE DETECTION APPARATUS AND POWER STEERING APPARATUS

(71) Applicant: HITACHI AUTOMOTIVE SYSTEMS, LTD., Hitachinaka-shi, Ibaraki (JP)

(72) Inventor: Osamu Yoshida, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 78 days.

This patent is subject to a terminal disclaimer.

(21) Appl. No.: 15/322,627

(22) PCT Filed: Jun. 25, 2015

(86) PCT No.: PCT/JP2015/068317
§ 371 (c)(1),
(2) Date: Dec. 28, 2016

(87) PCT Pub. No.: WO2016/006461
PCT Pub. Date: Jan. 14, 2016

(65) Prior Publication Data
US 2017/0129532 A1 May 11, 2017

(30) Foreign Application Priority Data
Jul. 9, 2014 (JP) ................................ 2014-141097

(51) Int. Cl.
*B62D 5/04* (2006.01)
*G01L 3/10* (2006.01)
(Continued)

(52) U.S. Cl.
CPC ............ *B62D 5/04* (2013.01); *B62D 5/0403* (2013.01); *B62D 5/0421* (2013.01);
(Continued)

(58) Field of Classification Search
CPC ...... B62D 5/04; B62D 5/0403; B62D 5/0421; B62D 5/0454; B62D 5/0463; B62D 6/10; G01D 5/145; G01L 3/10; G01L 3/104
See application file for complete search history.

(56) References Cited

U.S. PATENT DOCUMENTS

| 6,912,923 B2 * | 7/2005 | Froehlich | G01L 3/104 73/862.331 |
| 7,406,884 B2 * | 8/2008 | Jerems | G01L 5/221 73/862.331 |

(Continued)

FOREIGN PATENT DOCUMENTS

JP 54-144990 A 11/1979
JP 09-056141 A 2/1997
(Continued)

*Primary Examiner* — Kevin Hurley
*Assistant Examiner* — Michael R Stabley
(74) *Attorney, Agent, or Firm* — Foley & Lardner LLP

(57) ABSTRACT

The present invention provides a rotational angle detection apparatus and a power steering apparatus capable of preventing or reducing distortion of a detection member and improving detection accuracy. A welded plate and a yoke holder are fixedly welded to each other with a pair of yokes sandwiched between the welded plate and the yoke holder.

15 Claims, 9 Drawing Sheets

(51) Int. Cl.
*B62D 6/10* (2006.01)
*G01D 5/14* (2006.01)

(52) U.S. Cl.
CPC ......... *B62D 5/0454* (2013.01); *B62D 5/0463* (2013.01); *B62D 6/10* (2013.01); *G01D 5/145* (2013.01); *G01L 3/10* (2013.01); *G01L 3/104* (2013.01)

(56) References Cited

U.S. PATENT DOCUMENTS

| | | | | |
|---|---|---|---|---|
| 7,723,878 | B2* | 5/2010 | Yagai | H02K 3/522 |
| | | | | 310/71 |
| 8,375,810 | B2* | 2/2013 | Bae | G01L 3/10 |
| | | | | 73/862.334 |
| 8,955,396 | B2* | 2/2015 | Bae | G01L 3/10 |
| | | | | 73/862.334 |
| 9,505,431 | B2* | 11/2016 | Yoshida | B62D 6/10 |
| 9,702,776 | B2* | 7/2017 | Schoepe | G01L 5/221 |
| 2010/0319466 | A1* | 12/2010 | Bae | G01L 3/104 |
| | | | | 73/862.325 |
| 2013/0125668 | A1* | 5/2013 | Bae | G01L 3/104 |
| | | | | 73/862.325 |

FOREIGN PATENT DOCUMENTS

| | | | | |
|---|---|---|---|---|
| JP | 2004-135402 | * | 9/2002 | ............... H02K 3/38 |
| JP | 2004-093183 A | | 3/2004 | |
| JP | 2004-135402 A | | 4/2004 | |
| JP | 2008-180518 A | | 8/2008 | |
| JP | 2009-271055 A | | 11/2009 | |
| JP | 2010-539472 A | | 12/2010 | |
| WO | WO-2009/035266 A2 | | 3/2009 | |

* cited by examiner

ROTATIONAL ANGLE DETECTION APPARATUS AND POWER STEERING APPARATUS

TECHNICAL FIELD

The present invention relates to a rotational angle detection apparatus and a power steering apparatus.

BACKGROUND ART

A conventional rotational angle detection apparatus includes a permanent magnet and a pair of yokes rotatable relative to each other, a pair of magnetic collection rings that guides a magnetic flux generated between the pair of yokes due to the relative rotation between the permanent magnet and the pair of yokes, and a Hall IC sensor that detects the magnetic flux between the magnetic collection rings. The pair of yokes and the pair of magnetic collection rings, which are a detection member, are each made from a soft magnetic material, such as a permalloy, and are formed integrally with a resin holder by insert-molding formation and fixed to an input/output shaft or a housing via the holder. PTL 1 discusses one example relating to the above-described technique.

CITATION LIST

Patent Literature

PTL 1: Japanese Patent Application Public Disclosure No. 2008-180518

SUMMARY OF INVENTION

Technical Problem

However, the above-described conventional technique involves such a problem that the insert-molding is accompanied with contraction during cooling, which causes an internal stress inside the detection member, thereby leading to distortion of the detection member and thus an increase in magnetic hysteresis of the permalloy due to a magnetic loss, resulting in deterioration of detection accuracy.

An object of the present invention is to provide a rotational angle detection apparatus and a power steering apparatus capable of preventing or reducing the distortion of the detection member and improving the detection accuracy.

Solution to Problem

In a rotational angle detection apparatus according to one aspect of the present invention, a first holding member and a second holding member are fixedly welded to each other with a detection member sandwiched between the first holding member and the second holding member.

Advantageous Effects of Invention

Therefore, the present invention can prevent or reduce the distortion of the detection member and improve the detection accuracy.

DESCRIPTION OF EMBODIMENTS

First Embodiment

First, a configuration will be described.
[Electric Power Steering Apparatus]

Figure 1:
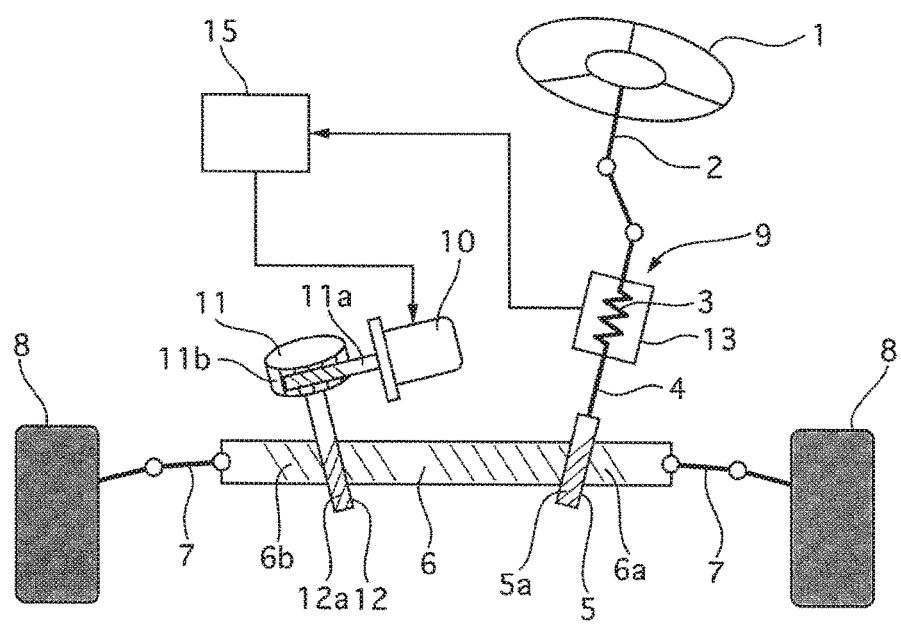
FIG. 1 illustrates an overall configuration of an electric power steering apparatus according to a first embodiment.

FIG. 1 illustrates an overall configuration of an electric power steering apparatus according to a first embodiment.

A steering input provided from a driver to a steering wheel 1 is transmitted as a rotational motion to a first pinion 5 via a steering shaft (a second member or an input shaft) 2, a torsion bar 3, and a pinion shaft (a first member or an output shaft) 4, and is converted into a linear motion by a rack bar 6 including first rack teeth 6a meshed with pinion teeth 5a of the first pinion 5. The linear motion of the rack bar 6 is transmitted to turning target wheels 8 and 8 via tie rods 7 and 7. A steering mechanism 9 which transmits the steering operation performed on the steering wheel 1 to the turning target wheels 8 and 8 is formed by the steering shaft 2, the torsion bar 3, the pinion shaft 4, the first pinion 5, the rack bar 6, and the tie rods 7 and 7.

On the other hand, an output of an electric motor 10 is transmitted to a second pinion 12 via a speed reducer 11 including a worm shaft 11a and a worm wheel 11b, and is converted into a rectilinear motion of the rack bar 6 via second rack teeth 6b meshed with pinion teeth 12a of the second pinion 12. The second pinion 12 is provided integrally with the worm wheel 11b. The electric motor 10 is, for example, a three-phase brushless motor, and supplies a steering assist force to the steering mechanism 9 according to an instruction signal from a motor control circuit 15.

A torque sensor (a rotational angle detection apparatus) 13 is provided at the steering shaft 2. The torque sensor 13 detects a relative rotation between the steering shaft 2 and the pinion shaft 4.

The motor control circuit 15 calculates the instruction signal directed to the electric motor 10 based on a steering torque generated between the steering shaft 2 and the pinion shaft 4 that is acquired from a signal output from the torque sensor 13, and a running state such as a vehicle speed, and outputs this instruction signal to the electric motor 10.

Figure 2:
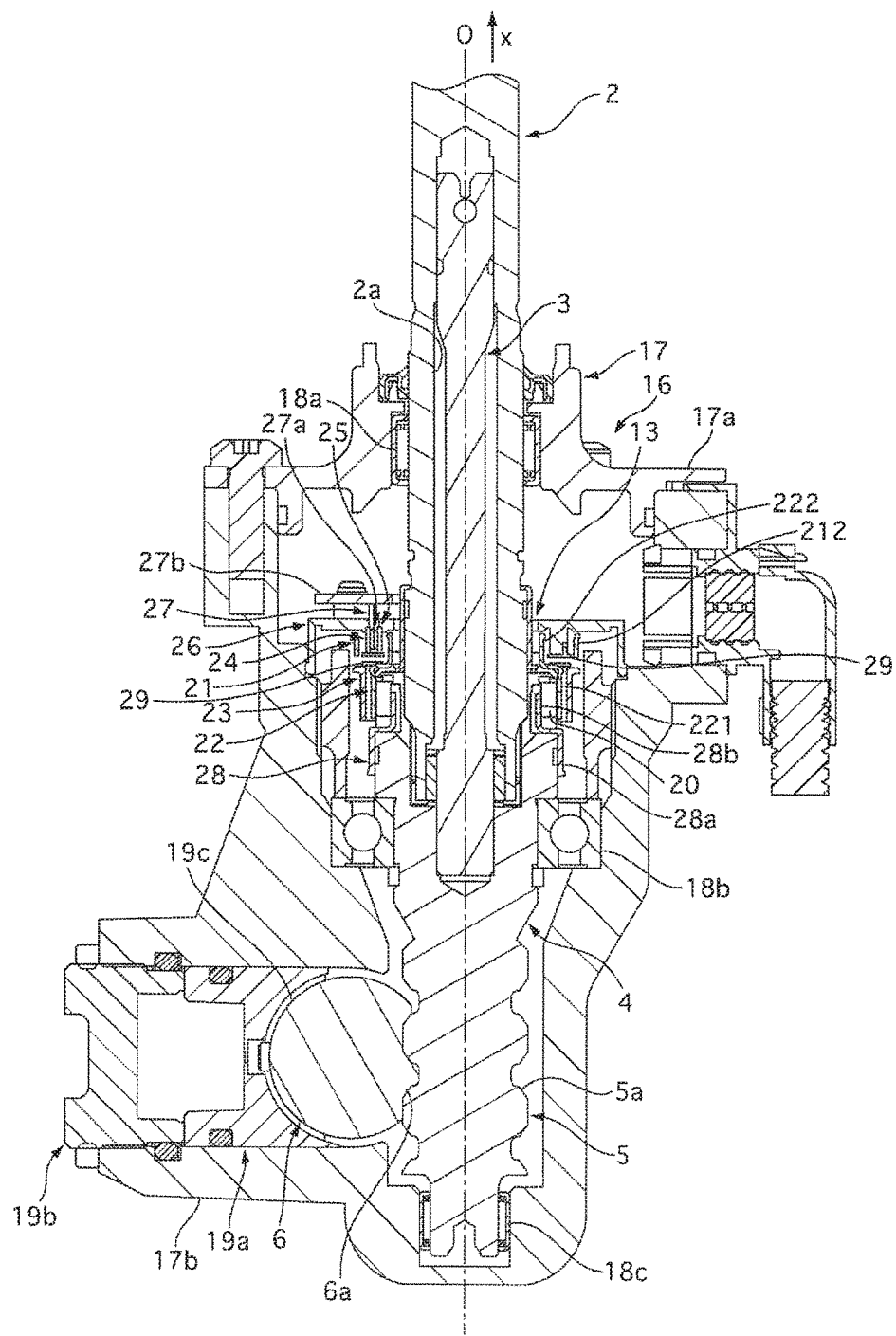
FIG. 2 is a vertical cross-sectional view of a steering gear box 16 according to the first embodiment.

FIG. 2 is a vertical cross-sectional view of a steering gear box 16.

The steering gear box 16 includes a gear box housing (a housing) 17. The steering shaft 2 and the pinion shaft 4 rotate relative to the gear box housing 17 around a same rotational axis O. Hereinafter, an x axis is defined to be a direction extending along the rotational axis O, and a positive direction is defined to be a steering shaft 2-side with respect to the pinion shaft 4. The gear box housing 17 includes a shaft containing portion 17a, a guide containing portion 17b, and a rack containing portion (not illustrated). The shaft containing portion 17a is disposed in such a manner that a longitudinal direction thereof matches the rotational axis direction. The guide containing portion 17b extends from this shaft containing portion 17a to a rear side of the vehicle. The rack containing portion is provided orthogonally to the shaft containing portion 17a, and is disposed in such a manner that a longitudinal direction thereof generally matches a width direction of the vehicle. All of the shaft containing portion 17a, the guide containing portion 17b, and the rack containing portion are cylindrically shaped.

A part of the steering shaft 2 and the torsion bar 3, the pinion shaft 4, and the torque sensor 13 are contained in the shaft containing portion 17a. The torsion bar 3 is inserted in a hollow portion 2a which is provided at an end of the steering shaft 2 located in a negative direction of the x axis so as to be prohibited from rotating relative thereto. An end of the torsion bar 3 that is located in the negative direction of the x axis is fitted to the pinion shaft 4 by spline fitting. The steering shaft 2 is supported rotatably relative to the gear box housing 17 via a bearing 18a. Both ends of the pinion shaft 4 in the x axis direction are supported rotatably relative to the gear box housing 17 via bearings 18b and 18c.

The rack bar 6 is contained in the rack containing portion.

A generally cylindrical rack guide 19a is contained in the guide containing portion 17b axially displaceably along the guide containing portion 17b. Further, a cap 19b is threadedly engaged with an end of the guide containing portion 17b on an opening side. A sheet 19c which is used to, for example, prevent wear of the rack guide 19a is attached to a rack bar side of the rack guide 19a.

[Torque Sensor]

The torque sensor 13 includes a multipole magnet (a magnetic member) 20, a pair of yokes (a detection member) 21 and 22, a yoke holder (a first holding member) 23, a pair of magnetic collection rings (the detection member) 24 and 25, a magnetic collection ring holder (the first holding member) 26, and a Hall IC sensor (a magnetic sensor) 27. The multipole magnet 20, the pair of yokes 21 and 22, the yoke holder 23, the pair of magnetic collection rings 24 and 25, and the magnetic collection ring holder 26 are disposed concentrically with the rotational axis O.

The multipole magnet 20 is a cylindrical permanent magnet having sixteen poles (the same numbers of N poles and S poles) alternately magnetized at circumferentially even intervals. The multipole magnet 20 is fixed to the pinion shaft 4 via a magnet holder 28. The magnet holder 28 is formed into a cylindrical shape having a large-diameter portion 28a and a small-diameter portion 28b. The large-diameter portion 28a is fixed to an outer periphery of the end of the pinion shaft 4 that is located in the positive direction of the x axis. The small-diameter portion 28b is positioned on a positive side of the large-diameter portion 28a that is located in the positive direction of the x axis, and an inner periphery of the multipole magnet 20 is fixed thereto.

Figure 3:
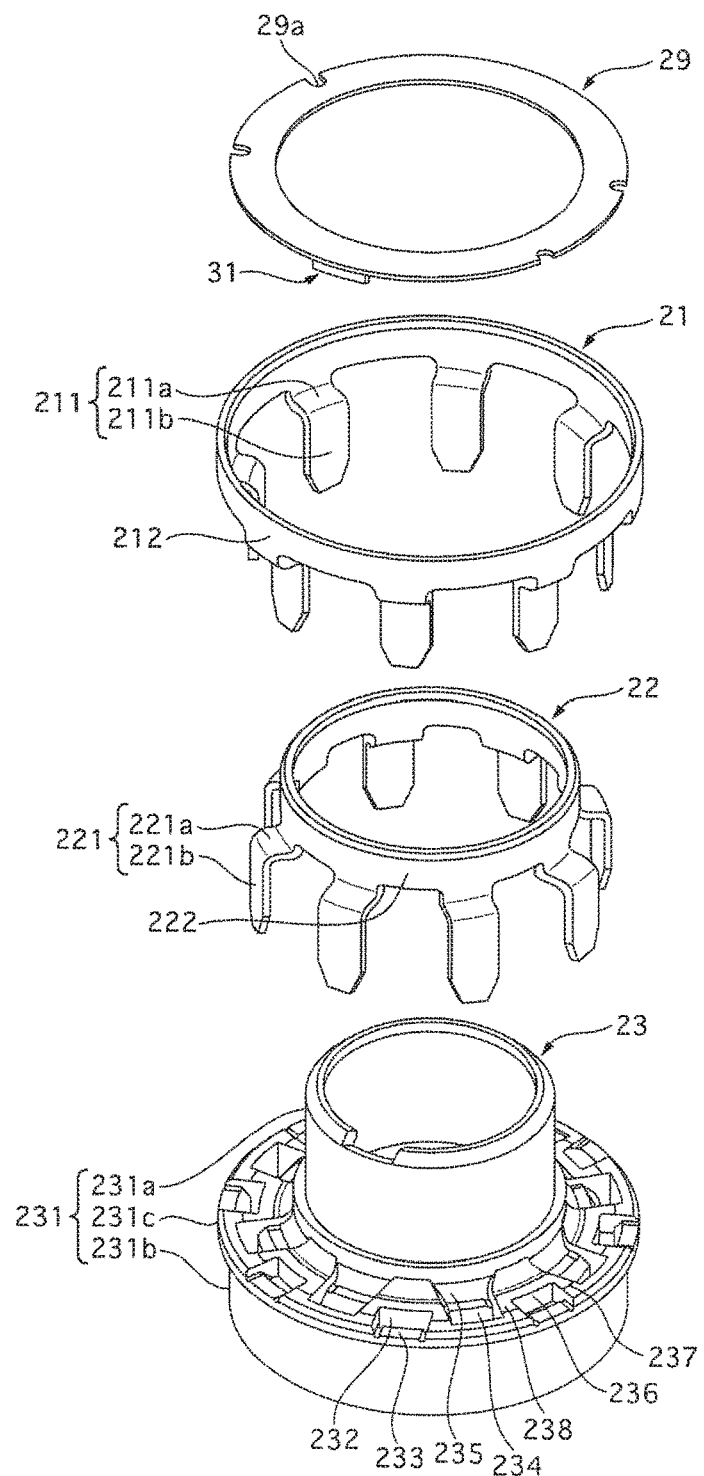
FIG. 3 is an exploded perspective view of a yoke assembly.

The pair of yokes 21 and 22 is made from a permalloy (a soft magnetic alloy), and includes eight claw portions 211 and eight claw portions 221 and annular portions 212 and 222, respectively, as illustrated in FIG. 3. The claw portions 211 and 221 are alternately disposed on the same circumference with a predetermined space generated therebetween so as to surround an outer periphery of the multipole magnet 20, and face the multipole magnet 20 with a predetermined radial space generated therebetween. The annular portions 212 and 222 are positioned on positive sides of the claw portions 211 and 221 that are located in the positive direction of the x axis, and face each other with a predetermined radial space generated therebetween. The pair of yokes 21 and 22 is disposed in such a manner that a distal end of each of the claw portions 211 and 221 is pointed to a boundary between the N pole and the S pole of the multipole magnet 20 in a steering neutral state in which no torque is applied to the steering shaft 2 and the pinion shaft 4.

The yoke holder 23 is made from thermoplastic resin, and is formed into a generally protruding shape. The yoke holder 23 holds the pair of yokes 21 and 22. The yoke holder 23 is fixed to the steering shaft 2.

The pair of magnetic collection rings 24 and 25 is each made from a permalloy, and formed into a C shape. The pair of magnetic collection rings 24 and 25 is disposed with a predetermined radial air gap generated from each other, and is placed at an intermediate position in the radial space between the annular portions 212 and 222 of the yokes 21 and 22 out of contact with both the yokes 21 and 22.

The magnetic collection ring holder 26 is made from thermoplastic resin, and is formed into a tubular shape. The magnetic collection ring holder 26 holds the pair of magnetic collection rings 24 and 25. The magnetic collection ring holder 26 is fixed to the gear box housing 17.

The Hall IC sensor 27 includes a Hall element 27a and a circuit substrate 27b, and detects a density of a magnetic flux generated in the radial air gap between the pair of magnetic collection rings 24 and 25. The Hall element 27a is disposed at an intermediate position in the radial air gap between the pair of magnetic collection rings 24 and 25 out of contact with both the magnetic collection rings 24 and 25. The circuit substrate 27b is connected to the Hall element 27a on a positive side of the magnetic collection ring holder 26 that is located in the positive direction of the x axis. Power from a battery of the vehicle is supplied to the Hall element 27a via the circuit substrate 27b, and an output of the Hall element 27a is introduced into the motor control circuit 15 via the circuit substrate 27b.

Now, a structure of each portion forming the torque sensor 13 will be described in detail.

[Yoke Assembly]

Figure 4:
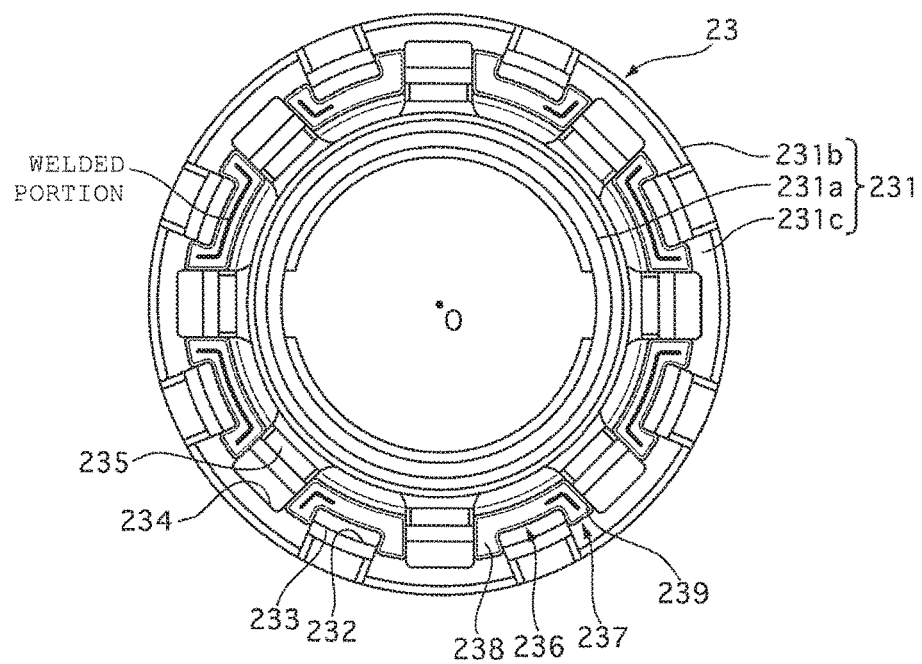
FIG. 4 is a plan view of a yoke holder 23.
Figure 5:
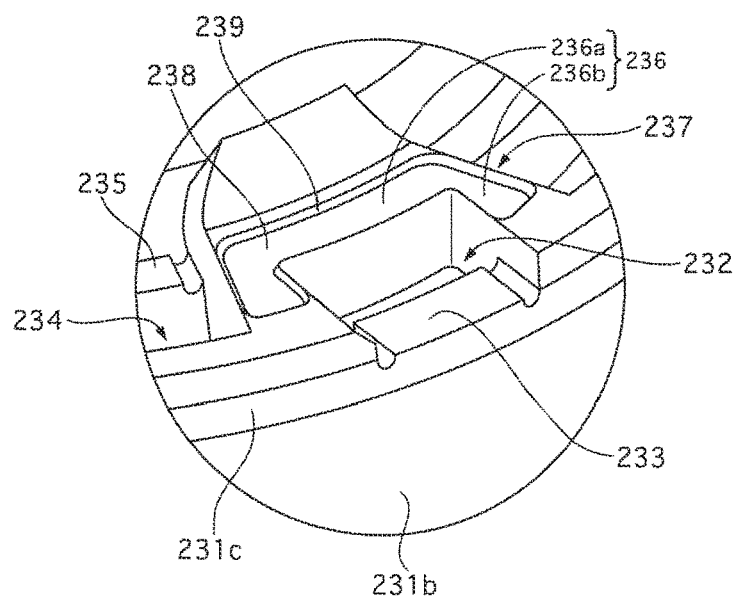
FIG. 5 is an enlarged view of a main portion of FIG. 3.

FIG. 3 is an exploded perspective view of the yoke assembly. FIG. 4 is a plan view of the yoke holder 23. FIG. 5 is an enlarged view of a main portion of FIG. 3.

The yoke assembly includes the pair of yokes 21 and 22, the yoke holder 23, and a welded plate (a second holding member) 29. The welded plate 29 and the yoke holder 23 form the holding member.

The first yoke (a first yoke member) 21 includes the eight first claw portions 211 and the first annular portion 212. Each of the first claw portions 211 is a plate-like member, and is formed so as to taper toward a distal end thereof. The first annular portion 212 is formed annularly so as to surround the rotational axis O. Each of the first claw portions 211 includes a first bent portion 211a and a first detection portion 211b. The first bent portion 211a extends from the first annular portion 212 in a radially inward direction. The first detection portion 211b extends from the first bent portion 211a along the x axis direction so as to face the multipole magnet 20. Each of the first bent portions 211a is disposed orthogonally to the rotational axis O. Each of the first detection portions 211b is disposed orthogonally to a radial direction of the rotational axis O.

The second yoke (a second yoke member) 22 includes the eight second claw portions 221 and the second annular portion 222. Each of the second claw portions 221 is a plate-like member, and is formed so as to taper toward a distal end thereof. The second claw portion 221 has a same length as the first claw portion 211 in the x axis direction. The second annular portion 222 is formed annularly so as to surround the rotational axis O. The second annular portion 222 is set so as to be smaller in diameter than the first annular portion 212. Each of the second claw portions 221 includes a second bent portion 221a and a second detection portion 221b. The second bent portion 221a extends from the second annular portion 222 in a radially outward direction. The second detection portion 221b extends from the second bent portion 221a along the x axis direction so as to face the multipole magnet 20. Each of the second bent portions 221a is disposed orthogonally to the rotational axis O. Each of the second detection portions 221 is disposed so as to extend orthogonally to the radial direction of the rotational axis O and to be lined alternately between the adjacent first detection portions 211b and 211b.

The yoke holder 23 includes a main body portion 231, first through-holes 232, first containing portions 233, second through-holes 234, and second containing portions 235. The main body portion 231 includes a small-diameter portion 231a, a large-diameter portion 231b, and a mounting surface 231c. The small-diameter portion 213a has an inner diameter generally equal to an outer diameter of the steering shaft 2, and is fixed to an outer periphery of the steering shaft 2. The large-diameter portion 231b is set so as to be larger in diameter than the small-diameter portion 231a, and the claw portions 211 and 221 of the first yoke 21 and the second yoke 22 are contained therein. The mounting surface 231c is provided generally perpendicularly to the rotational axis O, and connects the small-diameter portion 231a and the large-diameter portion 231b to each other. The first annular portion 212 of the first yoke 21 and the second annular portion 222 of the second yoke 22 are placed on the mounting surface 231c. Each of the first through-holes 232 is formed so as to allow the first detection portion 211b to penetrate through the mounting surface 231c. Each of the first containing portions 233 is provided so as to extend continuously from the first through-hole 232 radially outwardly, and has a shape recessed so as to be opened to the mounting surface 231c-side. The first bent portion 211a is contained in the first containing portion 233. Each of the second through-holes 234 is formed so as to allow the second detection portion 221b to penetrate through the mounting surface 231c. Each of the second containing portions 235 is provided so as to extend continuously from the second through-hole 234 radially inwardly, and has a shape recessed so as to be opened to the mounting surface 231c-side. The second bent portion 221a is contained in the second containing portion 235.

Recessed portions 236 and wall portions 237 are provided on the mounting surface 231c. Eight recessed portions 236 are provided at circumferentially even intervals. Each of the recessed portions 236 includes an inner diameter side portion 236a and a radially extending portion 236b. The inner diameter side portion 236a is formed on a radially inner side of the first through-hole 232, and extends circumferentially. The inner diameter side portion 236a is formed in such a manner that a radial width thereof falls below half a width from an inner peripheral edge to an outer peripheral edge of the mounting surface 231c. The radially extending portion 236b is provided so as to extend through between the first through-hole 232 and a second through-hole 234 from both circumferential ends of the inner diameter side portion 236a radially outwardly. The recessed portion 236 includes a bottom portion 238 welded to the welded plate 29, and is formed so as to be opened to the welded plate 29-side (the positive side located in the positive direction of the x axis). The bottom portion 238 is shaped like a flat surface orthogonal to the x axis direction.

The wall portion 237 is provided so as to surround a whole circumference of an opening edge along the opening edge of the recessed portion 236, and is formed in such a manner that a distance between the wall portion 237 and the welded plate 29 in the x axis direction falls below a distance between the bottom portion 238 and the welded plate 29 in the x axis direction, and the wall portion 237 does not abut against the welded plate 29 when the yoke holder 23 and the welded plate 29 are fixedly welded to each other. The wall potion 237 includes an inclined portion 239 inclined in such a manner that an opening area of the recessed portion 236 is increasing from the bottom portion 238 toward the opening edge side.

Figure 6A:
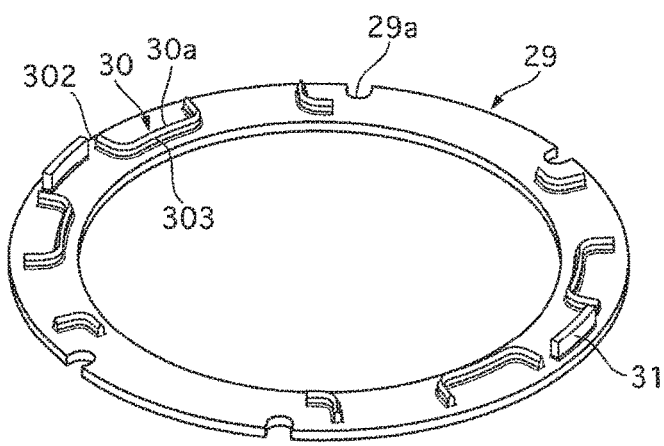
FIG. 6A is a perspective view of a welded plate 29.
Figure 6B:
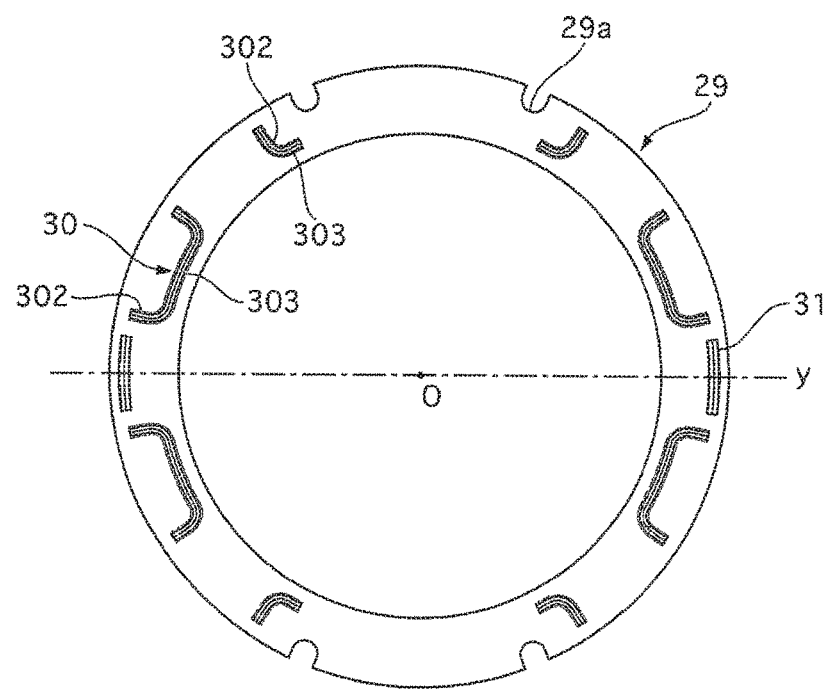
FIG. 6B is a plane view of the welded plate 29.
Figure 7:
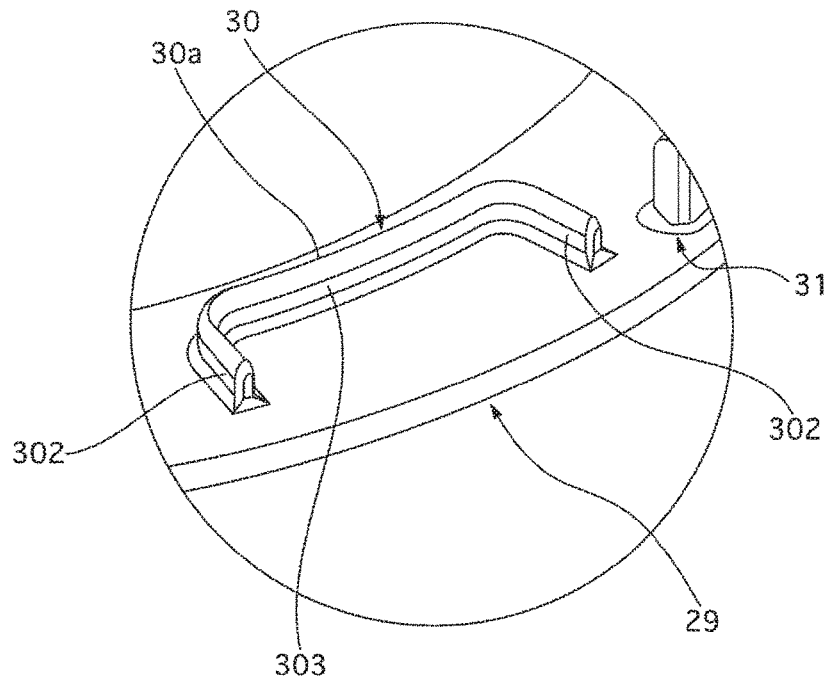
FIG. 7 is an enlarged view of a main portion of FIG. 6A.

FIG. 6A is a perspective view of the welded plate 29. FIG. 6B is a plan view of the welded plate 29. FIG. 7 is an enlarged view of a main portion of FIG. 6A.

The welded plate 29 holds the pair of yokes 21 and 22 between the yoke holder 23 and the welded plate 29 by abutting against the bent portions 211a and 221a of the pair of yokes 21 and 22. The welded plate 29 is disposed concentrically with the rotational axis O. The welded plate 29 is made from thermoplastic resin, and is formed into an annular shape having a larger inner peripheral diameter than the small-diameter portion 231a of the yoke holder 23 and a smaller outer peripheral diameter than the large-diameter portion 231b of the yoke holder 23. Four cutouts 29a are formed on an outer peripheral edge of the welded plate 29. Two cutouts 29a are disposed for each of a left side and a right side symmetrically about a y axis, assuming that the y axis is defined to extend on a predetermined straight line passing through the rotational axis O. An angle between the two cutouts 29a and 29a located on one of the left side and the right side of the y axis is 45 degrees. The same applies to the other of the left side and the right side of the y axis. A surface of the welded plate 29 on a positive side thereof located in the positive direction of the x axis is flatly formed, and a surface of the welded plate 29 on a negative side thereof located in the negative direction of the x axis includes eight protruding portions 30 provided at circumferentially even intervals.

Each of the protruding portions 30 allows the yoke holder 23 and the welded plate 29 to be welded to each other by being melted with a distal end thereof in abutment with the bottom portion 238. The protruding portion 30 is formed so as to face the recessed portion 236 and protrude orthogonally to the bottom portion 238, i.e., in the x axis direction. The protruding portion 30 includes a radially-extending protruding portion 302 extending from the radially inner side to the radially outer side, and a circumferentially-extending protruding portion 303 extending in the circumferential direction. Four protruding portions 30 positioned closer to the y axis, among the eight protruding portions 30, each have a U shape as viewed in the plan view that is formed from two radially-extending protruding portions 302 and one circumferential-extending protruding portion 303. Four protruding portions 30 located farther away from the y axis each have a dogleg shape as viewed in the plan view that is formed from one radially-extending protruding portion 302 and one circumferentially-extending protruding portion 303.

Figure 8:
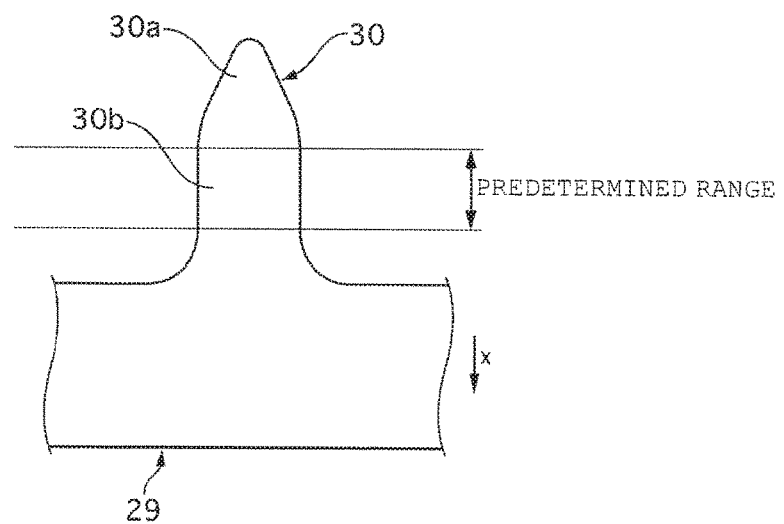
FIG. 8 is a cross-sectional view of a protruding portion 30.

FIG. 8 is a cross-sectional view of the protruding portion 30. The protruding portion 30 includes a distal end portion 30a and a proportionally melted portion 30b. The distal end portion 30a is formed into a pointed and generally cone shape. The proportionally melted portion 30b is positioned on the positive side located in the positive direction of the x axis with respect to the distal end portion 30a, and is formed in such a manner that a cross-sectional area in a direction orthogonal to the x axis is kept constant within a predetermined range in the x axis direction before the protruding portion 30 is melted.

Two engagement protrusions 31 are provided on the y axis on the surface of the welded plate 29 on the negative side located in the negative direction of the x axis. Each of the engagement protrusions 31 is engaged with the second through-hole 234 to regulate a circumferential displacement of the welded plate 29 relative to the yoke holder 23 when the yoke holder 23 and the welded plate 29 are fixedly welded to each other.

The distance between the bottom portion 238 of the yoke holder 23 and the welded plate 29 in the x axis direction is set in such a manner that, when the protruding portion 30 or a part of the bottom portion 238, which is melted when the yoke holder 23 and the welded plate 29 are fixedly welded to each other, is grown as a burr, this burr abuts against the welded plate 29.

In FIG. 4, a thick solid line indicates a portion where the bottom portion 238 and the protruding portion 30 are welded to each other.

The yoke assembly can be acquired by placing the welded plate 29 on the yoke holder 23 after the pair of yokes 21 and 22 is mounted on the yoke holder 23, and ultrasonically welding the yoke holder 23 and the welded plate 29 to each other. The ultrasonic welding is a processing technique that melts the thermoplastic resin instantaneously by a micro ultrasonic vibration and a pressing force to join them tougher. The installation of the pair of yokes 21 and 22 and the welded plate 29 onto the yoke holder 23 can be carried out entirely from one direction, which is advantageous in light of assemblability.

[Magnetic Collection Ring Assembly]

Figure 9:
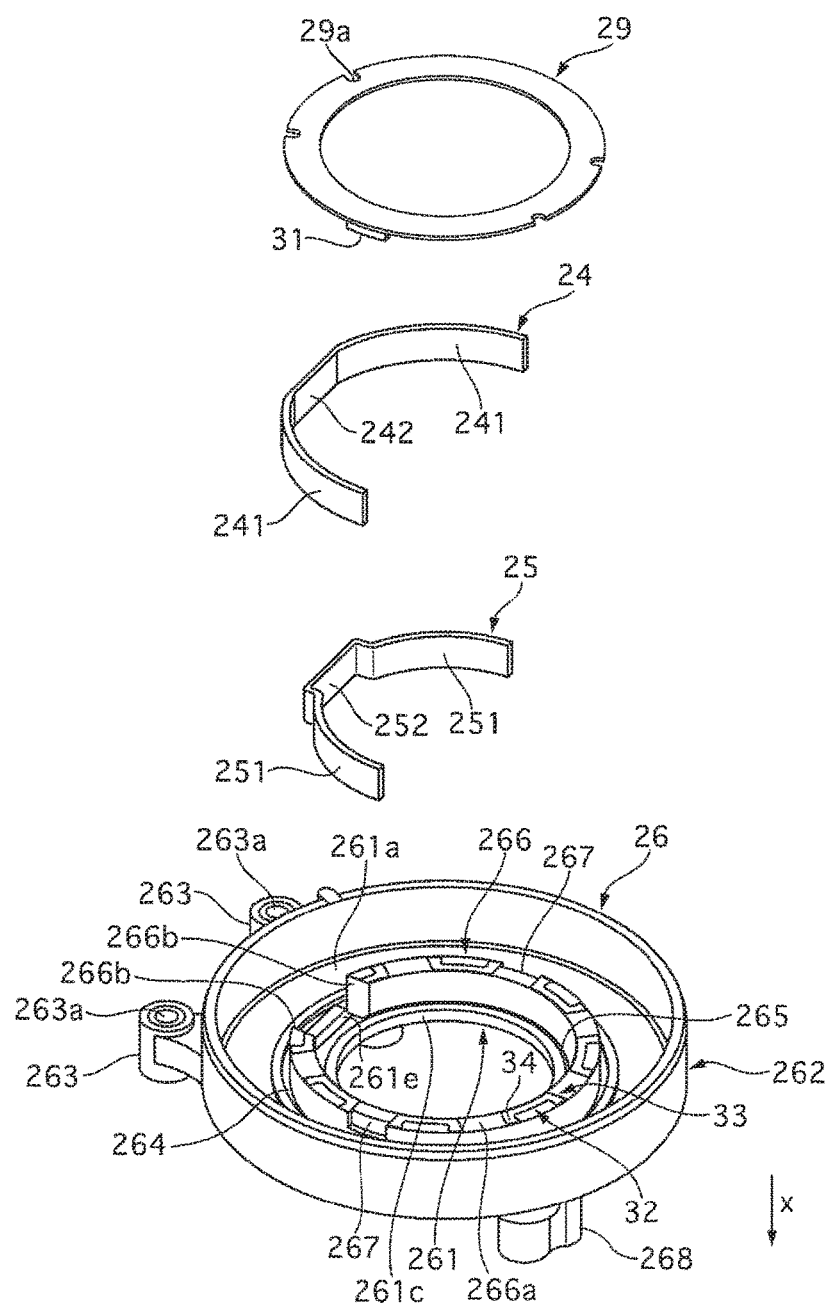
FIG. 9 is an exploded perspective view of a magnetic collection ring assembly.
Figure 10:
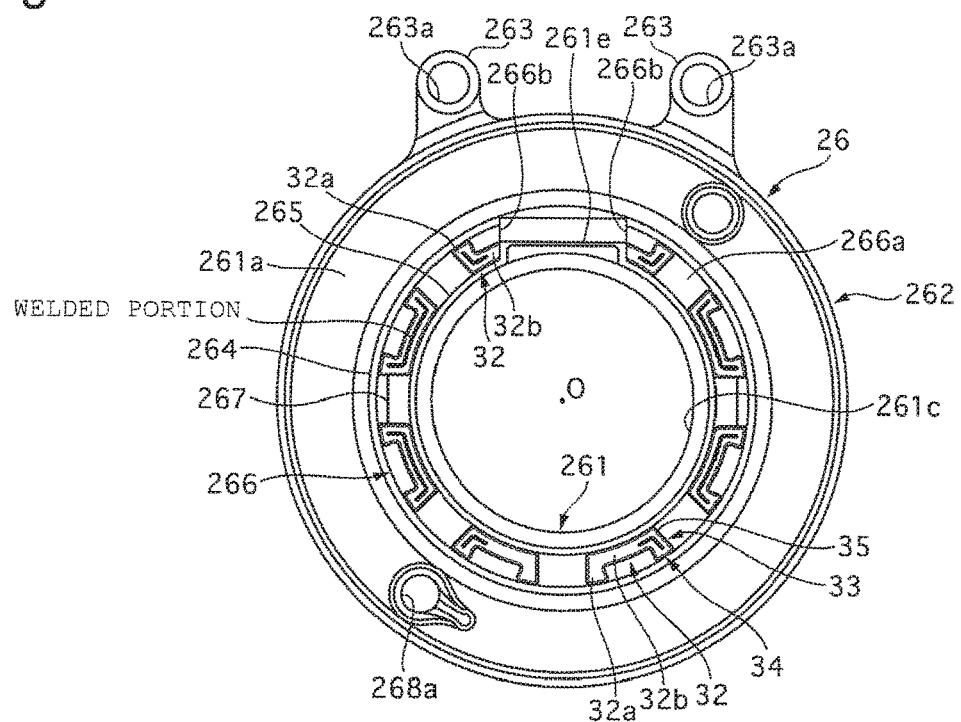
FIG. 10 is a plan view of a magnetic collection ring holder 26.
Figure 11:
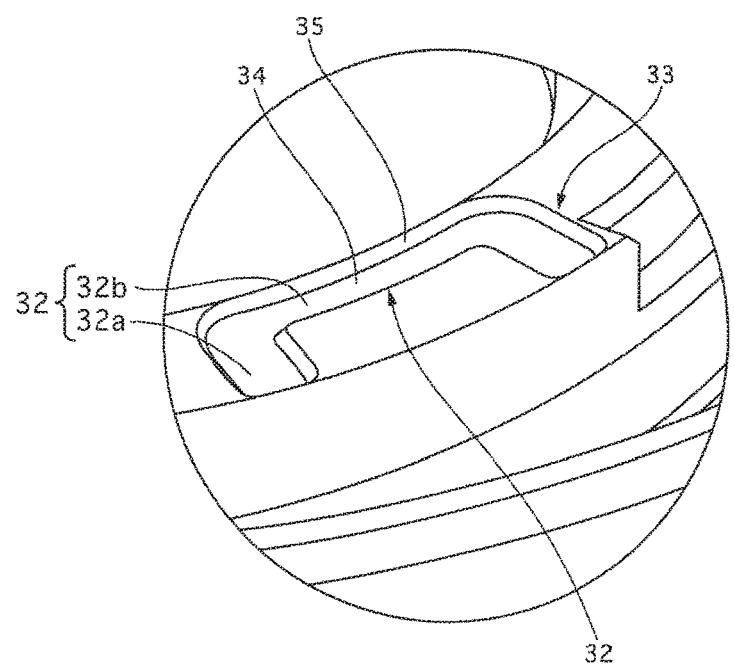
FIG. 11 is an enlarged view of a main portion of FIG. 9.

FIG. 9 is an exploded perspective view of a magnetic collection ring assembly. FIG. 10 is a plan view of the magnetic collection ring holder 26. FIG. 11 is an enlarged view of a main portion of FIG. 9.

The magnetic collection ring assembly includes the pair of magnetic collection rings 24 and 25, the magnetic collection ring holder 26, and the welded plate (the first holding member) 29. The welded plate 29 and the magnetic collection ring holder 26 form the holding member.

The first magnetic collection ring (a first detection member) 24 is formed so as to surround the rotational axis O, and includes a pair of arc portions 241 and 241 and a magnetic collection portion 242. The pair of arc portions 241 and 241 is formed so as to extend along a virtual circle centered at the rotational axis O, and faces each other. The magnetic collection portion 242 connects the pair of arc portions 241 and 241 to each other. The virtual circle of the pair of arc portions 241 and 241 is set so as to be larger in diameter than the second annular portion 222 of the second yoke 22 and smaller in diameter than the first annular portion 212 of the first yoke 21. The magnetic collection portion 242 is formed orthogonally to the rotational axis O.

The second magnetic collection ring (a second detection member) 25 is formed so as to surround the rotational axis O, and includes a pair of arc portions 251 and 251 and a magnetic collection portion 252. The pair of arc portions 251 and 251 is formed so as to extend along a virtual circle centered at the rotational axis O, and faces each other. The magnetic collection portion 252 connects the pair of arc portions 251 and 251 to each other. The virtual circle of the pair of arc portions 251 and 251 is set so as to be smaller in diameter than the virtual circle of the first magnetic collection ring 24 and larger in diameter than the second annular portion 222 of the second yoke 22. The magnetic collection portion 252 is shaped so as to protrude radially outwardly, and is formed orthogonally to the rotational axis O.

The magnetic collection ring holder 26 includes an annular portion 261, an outer peripheral portion 262, and two columnar portions 263. The annular portion 261 has an opening portion 261c at a center thereof. The outer peripheral portion 262 extends from an outer peripheral edge of the annular portion 261 toward the negative side located in the negative direction of the x axis. The two columnar portions 263 are provided on the radially outer side of the annular portions 261, and extend in the x axis direction.

The opening portion 261c of the annular portion 261 is set so as to be larger in diameter than an outer diameter of the yoke holder 23. A first engagement groove 264 and a second engagement groove 265 are formed on a surface 261a of the annular portion 261 on the negative side located in the negative direction of the x axis. The first engagement groove 264 contains an end of the first magnetic collection ring 24 that is located in the positive direction of the x axis. The second engagement groove 265 contains an end of the second magnetic collection ring 25 that is located in the positive direction of the x axis. An arc wall portion 266 is provided between the first engagement groove 264 and the second engagement groove 265. The arc wall portion 266 has a C shape in the plan view which includes a cutout at a portion corresponding to the magnetic collection portion 242 of the first magnetic collection ring 24 and the magnetic collection portion 252 of the second magnetic collection ring 25. When the first magnetic collection ring 24 and the second magnetic collection ring 25 are mounted in the first engagement groove 264 and the second engagement groove 265, respectively, the arc portions 241 and 241 of the first magnetic collection ring 24 abut against an outer peripheral surface of the arc wall portion 266, and the arc portions 251 and 251 of the second magnetic collection ring 25 abut against an inner peripheral surface of the arc wall portion 266. Further, the magnetic collection portion 252 of the second magnetic collection ring 25 abuts against an end surface 266b of the cutout portion of the arc wall portion 266. The magnetic collection portions 242 and 252 of the pair of magnetic collection rings 24 and 25 face each other at the cutout portion of the arc wall portion 266. An engagement groove 267 is formed on a surface 266a of the arc wall portion 266 that is located in the negative direction of the x axis. The engagement groove 267 is formed orthogonally to the rotational axis O, and is engaged with the engagement protrusion 31 of the welded plate 29 when the welded plate 29 is welded thereto. A length in the x axis direction from the first engagement groove 264 and the second engagement groove 265 to the surface 266a of the arc wall portion 266 that is located in the negative direction of the x axis is set so as to be shorter than lengths of the first magnetic collection ring 24 and the second magnetic collection ring 25 in the x axis direction.

Recessed portions 32 and wall portions 33 are provided on the surface 266a of the arc wall portion 266 that is located in the negative direction of the x axis. Eight recessed portions 32 are provided at circumferentially even intervals. Each of the recessed portions 236 includes a radially-extending recessed portion 32a extending from the radially inner side to the radially outer side, and a circumferentially-extending recessed portion 32b extending in the circumferential direction. Two recessed portions 32 positioned closer to the end surface 266b of the cutout portion of the arc wall portion 266, among the eight recessed portions 32, each include one radially-extending recessed portion 32a and one circumferentially-extending recessed portion 32b. The remaining six recessed portions 32 each include two radially-extending recessed portions 32a and one circumferentially-extending recessed portion 32b. Each of the circumferentially-extending recessed portions 32b is formed in such a manner that a radial width thereof falls below half a width from an inner peripheral edge to an outer peripheral edge of the arc wall portion 266. Each of the recessed portions 32 includes a bottom portion 34 welded to the welded plate 29, and is formed so as to be opened to the welded plate 29-side (the negative side located in the negative direction of the x axis). The bottom portion 34 is shaped like a flat surface orthogonal to the x axis direction.

Each of the wall portions 33 is provided so as to surround a whole circumference of an opening edge along the opening edge of the recessed portion 32, and is formed in such a manner that a distance between the wall portion 33 and the welded plate 29 in the x axis direction falls below a distance between the bottom portion 34 and the welded plate 29 in the x axis direction, and the wall portion 33 does not abut against the welded plate 29 when the magnetic collection ring holder 26 and the welded plate 29 are fixedly welded to each other. The wall portion 33 includes an inclined portion 35 inclined in such a manner that an opening area of the recessed portion 32 is increasing from the bottom portion 34 toward the opening edge side.

A columnar portion 268 is provided on a surface of the annular portion 261 that is located in the positive direction of the x axis. The columnar portion 268 supports the circuit substrate 27b of the Hall IC sensor 27. A screw hole 268a is formed in the columnar portion 268. The screw hole 268a is used to fix the circuit substrate 27b with use of a bolt.

An opening portion 261e, through which the Hall IC sensor 27 penetrates, is formed at an axial position on the annular portion 261 that corresponds to the radial air gap between the pair of magnetic collection portions 242 and 252. A sensor portion of the Hall IC sensor 27 is disposed at an intermediate position of the radial air gap.

An end of the outer peripheral portion 262 on a negative side thereof located in the negative direction of the x axis has an outer diameter that allows this end to be fittedly inserted in a sidewall of the shaft containing portion 17a of the gear box housing 17 (refer to FIG. 2).

A screw hole 263a is formed in each of the columnar portion 263. The screw hole 263a is used to fix the magnetic collection ring holder 26 to the gear box housing 17 with use of a bolt.

The welded plate 29 is the same as the welded plate 29 of the yoke assembly. A distance between the bottom portion 34 of the magnetic collection ring holder 26 and the welded plate 29 in the x axis direction is set in such a manner that, when the protrusion 30 or a part of the bottom portion 34 melted when the magnetic collection ring holder 26 and the welded plate 29 are fixedly welded to each other, is grown as a burr, this burr abuts against the welded plate 29.

In FIG. 10, a thick solid line indicates a portion where the bottom portion 34 and the protruding portion 30 are welded to each other.

The magnetic collection ring assembly can be acquired by placing the welded plate 29 on the magnetic collection ring holder 26 after the pair of magnetic collection rings 24 and 25 is mounted on the magnetic collection ring holder 26, and ultrasonically welding the magnetic collection ring holder 26 and the welded plate 29 to each other. The installation of the pair of magnetic collection rings 24 and 25 and the welded plate 29 onto the magnetic collection ring holder 26 can be carried out entirely from one direction, which is advantageous in light of assemblability. Further, the welded plate 29 used here is the same member as the welded plate 29 of the yoke assembly, which can prevent or cut down an increase in the number of parts, contributing to a cost reduction.

Next, an operation of the torque sensor 13 according to the first embodiment will be described.

When no torque is input, a circumferential center of each of the claw portions 211 and 221 is positioned on the boundary between the poles of the multipole magnet 20, and permeance is equal with respect to the N pole and the S pole of the multipole magnet 20 from the viewpoint of the claw portions 211 and 221, so that magnetic flux generated from the N pole of the multipole magnet 20 enters the claw portions 211 and 221 and enters the S pole of the multipole magnet 20 directly. Therefore, no magnetic flux flows between the pair of magnetic collection rings 24 and 25, whereby the Hall IC sensor 27 outputs an intermediate voltage.

When the driver rotates the steering wheel 1, the torsion bar 3 is distorted, and a relative angular displacement is generated between the steering shaft 2 and the pinion shaft 4. This relative angular displacement emerges as a relative angular displacement between the claw portions 211 and 221 and the multipole magnet 20. When the relative angular displacement is generated between the claw portions 211 and 221 and the multipole magnet 20, the balance of the permeance is lost, so that the magnetic flux generated from a magnetic circuit including the Hall IC sensor 27, i.e., the N pole of the multipole magnet 20 flows to one of the claw portions 211 and 221 that faces the N pole over a wider area, and flows to the magnetic circuit returning to the S pole of the multipole magnet 20 from one of the claw portions 211 and 221 that faces the S pole over a wider area via the pair of magnetic collection rings 24 and 25. At this time, the magnetic flux flowing between the pair of magnetic collection rings 24 and 25 is detected by the Hall IC sensor 27, by which the relative angular displacement can be measured and thus the torque applied to the torsion bar 3 can be detected.

Next, functions and advantageous effects of the first embodiment will be described.

[Improvement of Detection Accuracy]

In the case where the holding member holds the detection member through the insert-molding in the rotational angle detection apparatus, an internal stress may occur in the detection member due to contraction of the holding member during cooling, resulting in the deterioration of the detection accuracy.

On the other hand, in the yoke assembly according to the first embodiment, the welded plate 29 and the yoke holder 23 are fixedly welded to each other with the pair of yokes 21 and 22 sandwiched between the welded plate 29 and the yoke holder 23 in the x axis direction. Therefore, no internal stress occurs in the pair of yokes 21 and 22 due to the contraction during the cooling that is caused along with the insert-molding. As a result, distortion of the pair of yokes 21 and 22 can be prevented or reduced, and the detection accuracy of the torque sensor 13 can be improved. Further, the two yokes 21 and 22 can be held with the pair of holding members (the welded plate 29 and the yoke holder 23), which eliminates the necessity of preparing the welded plate for each yoke, succeeding in a reduction in the number of parts. Further, the torque detection accuracy is improved, which allows the electric power steering apparatus to control the steering assist force highly accurately.

In the magnetic collection ring assembly according to the first embodiment, the welded plate 29 and the magnetic collection ring holder 26 are fixedly welded to each other with the pair of magnetic collection rings 24 and 25 sandwiched between the welded plate 29 and the magnetic collection holder 26 in the x axis direction. Therefore, no internal stress occurs in the pair of magnetic collection rings 24 and 25 due to the contraction during the cooling that is caused along with the insert-molding As a result, distortion of the pair of magnetic collection rings 24 and 25 can be prevented or reduced, and the detection accuracy of the torque sensor 13 can be improved. Further, the two magnetic collection rings 24 and 25 can be held with the pair of holding members (the welded plate 29 and the magnetic collection ring holder 26), which eliminates the necessity of preparing the welded plate for each magnetic collection ring, succeeding in a reduction in the number of parts. Further, the torque detection accuracy is improved, which allows the electric power steering apparatus to control the steering assist force highly accurately.

[Prevention or Reduction of Drop of Burr]

The protruding portion 30 or the bottom portion 238 is melted and the burr is generated when the yoke holder 23 and the welded plate 29 are fixedly welded to each other. If this burr drops off, inconvenience such as an entry of a foreign object may occur. Therefore, the yoke assembly according to the first embodiment is provided with the recessed portion 236 welded to the protruding portion 30 of the welded plate 29, and the wall portion 237 surrounding the whole circumference of the opening edge of the recessed portion 236 and positioned a shorter distance away from the welded plate 29 than the bottom portion 238 is. This provision allows the burr generated when the yoke holder 23 and the welded plate 29 are fixedly welded to each other to be contained in the recessed portion 236 surrounded by the wall portion 237, succeeding in preventing or reducing the drop of the burr off from the yoke assembly.

Further, the magnetic collection assembly according to the first embodiment is provided with the recessed portion 32 welded to the protruding portion 30 of the welded plate 29, and the wall portion 33 surrounding the whole circumference of the opening edge of the recessed portion 32 and positioned a shorter distance away from the welded plate 29 than the bottom portion 34 is. This provision allows the burr generated when the magnetic collection ring holder 26 and the welded plate 29 are fixedly welded to each other to be contained in the recessed portion 32 surrounded by the wall portion 33, succeeding in preventing or reducing the drop of the burr off from the magnetic collection ring assembly.

[Prevention or Reduction of Clattering of Burr]

Figure 12A:
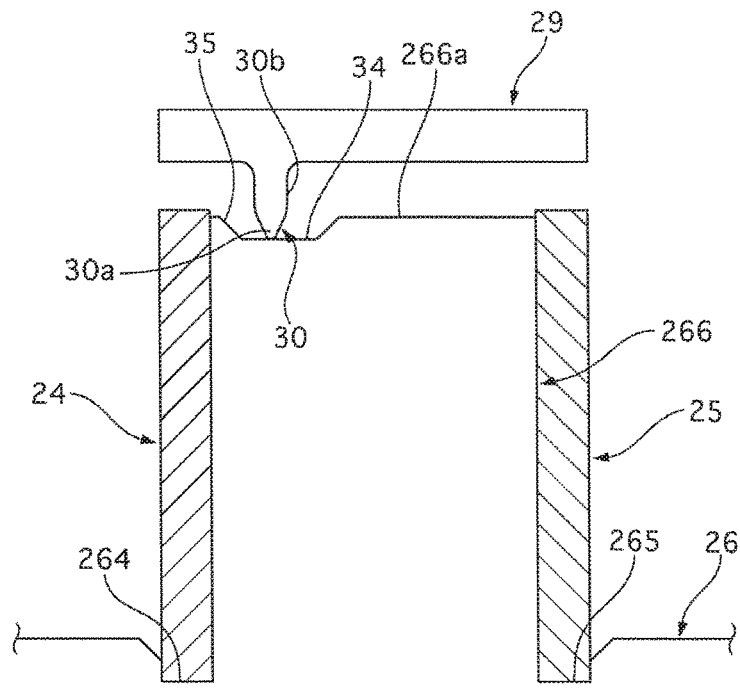
FIG. 12A illustrates how a burr is generated when the magnetic collection ring holder 26 and the welded plate 29 are ultrasonically welded to each other.
Figure 12B:
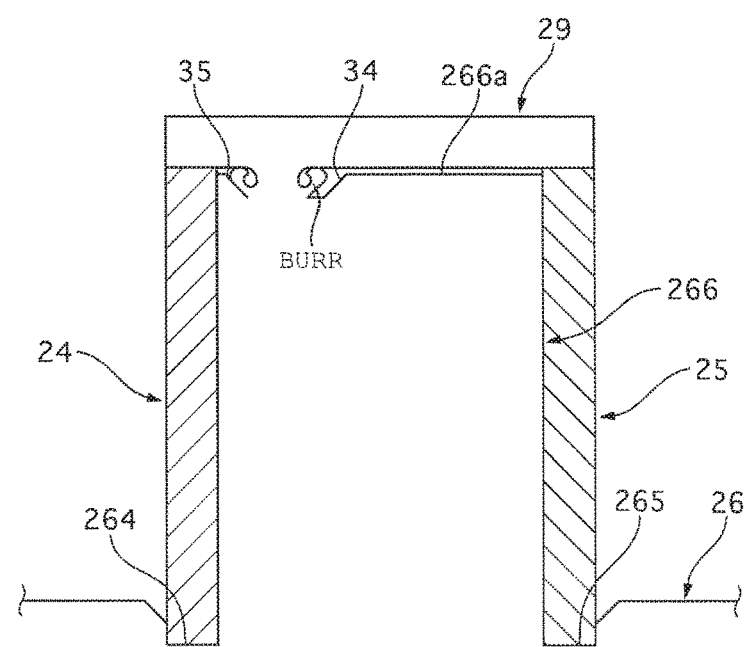
FIG. 12B illustrates how the burr is generated when the magnetic collection ring holder 26 and the welded plate 29 are ultrasonically welded to each other.

FIGS. 12A and 12B illustrate how the burr is generated when the magnetic collection ring holder 26 and the welded plate 29 are ultrasonically welded to each other. When the welded plate 29 is pressed toward the magnetic collection ring holder 26-side while frictional heat is generated by frictionally vibrating the magnetic collection ring holder 26 and the welded plate 29 with the aid of vibration energy from a state in which the protruding portion 30 is in abutment with the bottom portion 34 as illustrated in FIG. 12A, the protruding portion 30 or the part of the bottom portion 34 is grown as the burr. Now, in the magnetic collection ring assembly according to the first embodiment, the distance between the welded plate 29 and the bottom portion 34 is set so as to allow the grown burr to abut against the welded plate 29. As a result, the grown burr is brought into a state sandwiched between the bottom portion 34 and the welded plate 29 as illustrated in FIG. 12B, which can prevent or reduce clattering of the burr in the recessed portion 32.

Further, the circumferentially-extending recessed portion 32b of the recessed portion 32 is formed in such a manner that the radial width thereof falls below half the width from the inner circumferential edge to the outer circumferential edge of the arc wall portion 266. In other words, the radial width of the recessed portion 32 is prevented from becoming larger than necessary, which can prevent or reduce the clattering of the burr in the recessed portion 32.

In the yoke assembly according to the first embodiment, the distance between the welded plate 29 and the bottom portion 238 is set in such a manner that, when the protruding portion 30 or the part of the bottom portion 238 which is melted when the yoke holder 23 and the welded plate 29 are fixedly welded to each other is grown as the burr, this burr abuts against the welded plate 29. As a result, the burr is sandwiched between the bottom portion 238 and the welded plate 29, which can prevent or reduce the clattering (a displacement) of the burr in the recessed portion 236.

Further, the inner diameter side portion 236a of the recessed portion 236 is formed in such a manner that the radial width thereof falls below half the width from the inner peripheral edge to the outer peripheral edge of the mounting surface 231c. In other words, the radial width of the recessed portion 236 is prevented from becoming larger than necessary, which can prevent or reduce the clattering of the burr in the recessed portion 236.

[Enhancement of Welding Strength]

In the yoke assembly according to the first embodiment, the recessed portion 236 and the protruding portion 30 each include the portion extending from the radially inner side toward the radially outer side (the radially extending portion 236b and the radially-extending protruding portion 302), and the circumferentially extending portion (the inner diameter side portion 236a and the circumferentially-extending protruding portion 303). In other words, the provision of the radially-extending welded portion and the circumferentially-extending welded portion can increase the melted length in the orthogonal directions compared to provision of the welded portion in only one of the radial direction and the circumferential direction, thereby enhancing the welding strength.

In the magnetic collection assembly according to the first embodiment, the recessed portion 32 and the protruding portion 30 each include the portion extending from the radially inner side toward the radially outer side (the radially-extending recessed portion 32a and the radially-extending protruding portion 302), and the circumferentially-extending portion (the circumferentially-extending recessed portion 32b and the circumferentially-extending protruding portion 303). In other words, the provision of the radially-extending welded portion and the circumferentially-extending welded portion can increase the melted length in the orthogonal directions compared to provision of the welded portion in only one of the radial direction and the circumferential direction, thereby enhancing the welding strength.

[Achievement of Both Securement of Strength and Securement of Volume]

In the yoke assembly according to the first embodiment, the wall portion 237 is provided with the inclined portion 239 inclined in such a manner that the opening area is increasing from the bottom portion 238 toward the opening edge side. If the opening area is constant from the bottom portion to the opening edge, an increase in the opening area makes it impossible to secure the strength of the wall portion. On the other hand, a reduction in the opening area makes it impossible to secure a necessary volume of the recessed portion for containing the burr. Therefore, the provision of the inclined portion 239 that allows the opening area to be increasing from the bottom portion 238 toward the opening edge side can achieve both the securement of the strength of the wall portion 237 and the securement of the volume of the recessed portion 236 at the same time.

In the magnetic collection ring assembly according to the first embodiment, the wall portion 33 is provided with the inclined portion 35 inclined in such a manner that the opening area is increasing from the bottom portion 34 toward the opening edge side. This provision can achieve both the securement of the strength of the wall portion 33 and the securement of the volume of the recessed portion 32 at the same time.

[Reduction in Generation Amount of Burr and Facilitation of Management]

In the first embodiment, the protruding portion 30 of the welded plate 29 includes the proportionally melted portion 30b formed in such a manner that the cross-sectional area thereof in the direction orthogonal to the x axis is kept constant within the predetermined range in the x axis direction before the protruding portion 30 is melted. If the entire protruding portion has such a shape that the diameter is gradually increasing from a distal end to a proximal side, such as a conical shape and a pyramid shape, the melted volume increases according to a quadratic curve with respect to a melted length in the x axis direction. In other words, a generation amount of the burr increases according to a quadratic curve with respect to the melted length, which makes it difficult to manage the generation amount of the burr. On the other hand, in the proportionally melted portion 30b according to the first embodiment, the melted volume increases proportionally to the melted length in the x axis direction, which can reduce the generation amount of the burr and also facilitate the management of the generation amount of the burr. The reduction in the generation amount of the burr allows the recessed portion 236 (or the recessed portion 32) to have a smaller volume necessary to contain the burr therein, thereby facilitating the securement of the strength of the wall portion 237 (or the wall portion 33).

[Achievement of Even Welding Strength and Prevention or Reduction of Insufficient Welding]

In the case where the entire protruding portion has a conical shape or a pyramid shape, according to a position joined to the bottom portion in the x axis direction, the cross-sectional area of the protruding portion at this joined position varies. Therefore, if the protruding portion is joined to the bottom portion at a different position in the x axis direction for each protruding position, this causes a variation in the welding strength. On the other hand, the protruding portion 30 according to the first embodiment includes the proportionally melted portion 30b formed in such a manner that the cross-sectional area thereof in the direction orthogonal to the x axis is kept constant within the predetermined range in the x axis direction before the protruding portion 30 is melted. Therefore, even when a change occurs in the position joined to the bottom portion 238 (or the bottom portion 34) in the x axis direction, this joined position can maintain a constant cross-sectional area. Therefore, even when the protruding portion 30 is joined to the bottom portion 238 (or the bottom portion 34) at a different position in the x axis direction for each protruding portion 30, the protruding portion 30 can be welded with even welding strength.

Further, in the case where the entire protruding portion has a conical shape or a pyramid shape, melting heat generated at the friction portion between the distal end portion of the protruding portion and the bottom portion easily leaks to the welding plate side. On the other hand, the proportionally welded portion 30b has the constant cross-sectional area within the predetermined range in the x axis direction, which can prevent or reduce the leak of the melting heat toward the welded plate 29-side. Insufficient welding serves as a cause for flotation of the welded plate 29 from the yoke holder 23 (or the magnetic collection ring holder 26), but, in the first embodiment, the protruding portion 30 is provided with the proportionally welded portion 30b, which can prevent or reduce the flotation of the welded plate 29.

Next, the configuration of the yoke assembly according to the first embodiment and advantageous effects corresponding thereto will be described.

(1) The first embodiment includes the pinion shaft 4 and the steering shaft 2 provided rotatably relative to each other around the rotational axis O, the multipole magnet 20 provided at the pinion shaft 4 and configured in such a manner that the N pole and the S pole are disposed alternately around the rotational axis O, the pair of yokes 21 and 22 provided so as to face the multipole magnet 20 and each made from the magnetic material, and the holding member fixed to the steering shaft 2 and including the yoke holder 23 and the welded plate 29 each made from the thermoplastic resin material. The holding member is configured to hold the pair of yokes 21 and 22 so as to prevent a contact between the pair of yokes 21 and 22 and the steering shaft 2 by the yoke holder 23 and the welded plate 29 fixedly welded to each other with the pair of yokes 21 and 22 sandwiched between the yoke holder 23 and the welded plate 29. The first embodiment further includes the recessed portion 236 provided on one side of the yoke holder 23 that faces the welded plate 29, including the bottom portion 238, and formed so as to be opened to the welded plate 29-side, the wall portion 237 provided along the opening edge of the recessed portion 236 and formed in such a manner that the distance between the wall portion 237 and the welded plate 29 falls below the distance between the bottom portion 238 and the welded plate 29 and the wall portion 237 does not abut against the welded plate 29, and the protruding portion 30 facing the recessed portion 236 and provided at the welded plate 29 so as to protrude toward the recessed portion 236-side. The protruding portion 30 is configured to allow the yoke holder 23 and the welded plate 29 to be welded to each other by being melted with the distal end portion 30a thereof in abutment with the bottom portion 238. The first embodiment further includes the Hall IC sensor 27 configured to detect the angle of the relative rotation between the pinion shaft 4 and the steering shaft 2 by detecting the change in the magnetic field in the pair of yokes 21 and 22 that changes due to the relative rotation between the multipole magnet 20 and the pair of yokes 21 and 22 that is caused along with the relative rotation between the pinion shaft 4 and the steering shaft 2.

Therefore, the pair of yokes 21 and 22 is not subject to the internal stress due to the contraction during the cooling that is caused along with the insert-molding, which can prevent or reduce the distortion of the pair of yokes 21 and 22 and improve the detection accuracy of the torque sensor 13.

Further, this configuration allows the burr generated when the yoke holder 23 and the welded plate 29 are fixedly welded to each other to be contained in the recessed portion 236 surrounded by the wall portion 237, thereby preventing or reducing the drop of the burr off from the yoke assembly.

(2) The welded plate 29 is provided in such a manner that the distance between the bottom portion 238 and the welded plate 29 is set so as to allow the protruding portion 30 or the part of the bottom portion 238 which is melted when the yoke holder 23 and the welded plate 29 are fixedly welded to each other to be grown as the burr, and the burr to abut against the welded plate 29.

Therefore, the burr is sandwiched between the bottom portion 238 and the welded plate 29, which can prevent or reduce the clattering (the displacement) of the burr in the recessed portion 236.

(3) The yoke holder 23 and the welded plate 29 are each formed into the annular shape or the arc shape so as to surround the rotational axis O. Assuming that the radial direction is the radial direction of the rotational axis O and the circumferential direction is the direction around the rotational axis O, the recessed portion 236 and the protruding portion 30 each include the portion extending from the inner side to the outer side in the radial direction (the radially extending portion 236b and the radially-extending protruding portion 302) and the portion extending in the circumferential direction (the inner diameter side portion 236a and the circumferentially-extending protruding portion 303).

Therefore, the melted length can increase in the orthogonal directions compared to the provision of the welded portion in only one of the radial direction and the circumferential direction, which can enhance the welding strength.

(4) The portion of the recessed portion 236 that extends in the circumferential direction is formed in such a manner that the width thereof in the radial direction falls below half the width from the inner circumferential edge to the outer circumferential edge of the mounting surface 231c of the yoke holder 23.

Therefore, the width of the recessed portion 236 in the radial direction can be prevented from becoming larger than necessary, which can prevent or reduce the clattering of the burr in the recessed portion 236.

(5) The wall portion 237 includes the inclined portion 239 inclined in such a manner that the opening area is increasing from the bottom portion 238 toward the opening edge-side.

Therefore, both the securement of the strength of the wall portion 237 and the securement of the volume of the recessed portion 236 can be achieved at the same time.

(6) The bottom portion 238 is shaped like the flat surface. Assuming that a reference axis line is the direction orthogonal to the flat surface of the bottom portion 238, the protruding portion 30 is formed so as to protrude along the direction of the reference axis line, and includes the proportionally melted portion 30b formed in such a manner that the cross-sectional area thereof in the direction orthogonal to the reference axis line is kept generally constant within the predetermined range in the direction of the reference axis line before the protruding portion 30 is melted.

Therefore, the first embodiment can reduce the generation amount of the burr and also facilitate the management of the generation amount of the burr. Further, the first embodiment can allow the protruding portion to be welded with even welding strength, and prevent or reduce insufficient welding.

(7) The first embodiment includes the steering mechanism 9 including the steering shaft 2 rotatable according to the rotation of the steering wheel 1 and the pinion shaft 4 connected to the steering shaft 2 via the torsion bar 3 and configured to transmit the steering operation performed on the steering wheel 1 to the turning target wheels 8 and 8, the gear box housing 17 rotatably holding the steering shaft 2 and the pinion shaft 4, the multipole magnet 20 provided at the pinion shaft 4 and configured in such a manner that the N pole and the S pole are disposed alternately around the rotational axis O, the pair of yokes 21 and 22 provided so as to face the multipole magnet 20 and each made from the magnetic material, and the holding member fixed to the steering shaft 2 and including the yoke holder 23 and the welded plate 29 each made from the thermoplastic resin material. The holding member is configured to hold the pair of yokes 21 and 22 so as to prevent a contact between the pair of yokes 21 and 22 and the steering shaft 2 by the yoke holder 23 and the welded plate 29 fixedly welded to each other with the pair of yokes 21 and 22 sandwiched between the yoke holder 23 and the welded plate 29. The first embodiment further includes the recessed portion 236 provided on one side of the yoke holder 23 that faces the welded plate 29, including the bottom portion 238, and formed so as to be opened to the welded plate 29-side, the wall portion 237 provided along the opening edge of the recessed portion 236 and formed in such a manner that the distance between the wall portion 237 and the welded plate 29 falls below the distance between the bottom portion 238 and the welded plate 29 and the wall portion 237 does not abut against the welded plate 29, and the protruding portion 30 facing the recessed portion 236 and provided at the welded plate 29 so as to protrude toward the recessed portion 236-side. The protruding portion 30 is configured to allow the yoke holder 23 and the welded plate 29 to be welded to each other by being melted with the distal end portion 30a thereof in abutment with the bottom portion 238. The first embodiment further includes the Hall IC sensor 27 configured to detect the angle of the relative rotation between the pinion shaft 4 and the steering shaft 2 by detecting the change in the magnetic field in the pair of yokes 21 and 22 that changes due to the relative rotation between the multipole magnet 20 and the pair of yokes 21 and 22 that is caused along with the relative rotation between the pinion shaft 4 and the steering shaft 2, the electric motor 10 configured to supply the steering assist force to the steering mechanism 9, and the motor control circuit 15 configured to calculate the instruction signal directed to the electric motor 10 based on the torque generated between the steering shaft 2 and the pinion shaft 4 that is acquired from the signal output from the Hall IC sensor 27, and output the instruction signal to the electric motor 10.

Therefore, the pair of yokes 21 and 22 is not subject to the internal stress due to the contraction during the cooling that is caused along with the insert-molding, which can prevent or reduce the distortion of the pair of yokes 21 and 22 and improve the detection accuracy of the torque sensor 13.

Further, this configuration allows the burr generated when the yoke holder 23 and the welded plate 29 are fixedly welded to each other to be contained in the recessed portion 236 surrounded by the wall portion 237, thereby preventing or reducing the drop of the burr off from the yoke assembly.

(8) Assuming that the radial direction is the radial direction of the rotational axis O and the circumferential direction is the direction around the rotational axis O, the pair of yokes 21 and 22 includes the first yoke 21 and the second yoke 22. The first yoke 21 includes the first annular portion 212 formed annularly so as to surround the rotational axis O, and the first claw portions 211 that are a plurality of plate-like members. The first claw portions 211 are prepared as the plurality of members so as to be arranged while being spaced apart from each other in the circumferential direction of the first annular portion 212. The first claw portions 211 each include the first bent portion 211a extending from the first annular portion 212 inwardly in the radial direction, and the first detection portion 211b extending from the first bent portion 211a so as to face the multipole magnet 20 along the direction of the rotational axis. The second yoke 22 includes the annularly formed second annular portion 222 disposed on the inner side in the radial direction with respect to the first annular portion 212 and provided so as to be spaced apart from the first annular portion 212, and the second claw portions 221 that are the plurality of plate-like members. The second claw portions 221 are prepared as the plurality of members so as to be arranged while being spaced apart from each other in the circumferential direction of the second annular portion 222. The second claw portions 221 each include the second bent portion 221a extending from the second annular portion 222 outwardly in the radial direction, and the second detection portion 221b extending from the second bent portion 221a so as to face the multipole magnet 20 along the direction of the rotational axis. The second detection portions 221b is each disposed so as to be lined alternately between the individual first detection portions 211b. The first detection portion 211b and the second detection portion 221b are disposed on the same circle centered at the rotational axis O. The yoke holder 23 includes the main body portion 231 including the mounting surface 231c that is the flat surface generally orthogonal to the rotational axis O, the first through-hole 232 formed so as to allow the first detection portion 211b to penetrate through the mounting surface 231c, and the first containing portion 233 provided so as to extend continuously from the first through-hole 232 outwardly in the radial direction. The first containing portion 233 is formed into the recessed shape so as to be opened to the mounting surface 231c-side, and is configured to contain the first bent portion 211a therein. The yoke holder 23 further includes the second through-hole 234 formed so as to allow the second detection portion 221b to penetrate through the mounting surface 231c, and the second containing portion 235 provided so as to extend continuously from the second through-hole 234 inwardly in the radial direction. The second containing portion 235 is formed into the recessed shape so as to be opened to the mounting surface 231c-side, and is configured to contain the second bent portion 221a therein. The recessed portion 236 includes the inner diameter side portion 236a formed on the inner side in the radial direction with respect to the first through-hole 232, and the radially extending portion 236b provided so as to extend through between the first through-hole 232 and the second through-hole 234 from the inner diameter side portion 236a outwardly in the radial direction.

Therefore, the reduction in the size of the apparatus can be attempted due to the recessed portion 236 provided so as to extend through the space between the first through-hole 232 and the first containing portion 233, and the second through-hole 234 and the second containing portion 235, which are lined side by side.

Next, the configuration of the magnetic collection ring assembly according to the first embodiment and advantageous effects corresponding thereto will be described.

(9) The first embodiment includes the pinion shaft 4 and the steering shaft 2 provided rotatably relative to each other around the rotational axis O, the multipole magnet 20 provided at the pinion shaft 4 and configured in such a manner that the N pole and the S pole are disposed alternately around the rotational axis O, the pair of magnetic collection rings 24 and 25 provided so as to face the multipole magnet 20 and each made from the magnetic material, and the holding member fixed to the steering shaft 2 and including the magnetic collection ring holder 26 and the welded plate 29 each made from the thermoplastic resin material. The holding member is configured to hold the pair of magnetic collection rings 24 and 25 so as to prevent a contact between the pair of magnetic collection rings 24 and 25 and the steering shaft 2 by the magnetic collection ring holder 26 and the welded plate 29 fixedly welded to each other with the pair of magnetic collection rings 24 and 25 sandwiched between the magnetic collection ring holder 26 and the welded plate 29. The first embodiment further includes the recessed portion 32 provided on one side of the magnetic collection ring holder 26 that faces the welded plate 29, including the bottom portion 34, and formed so as to be opened toward the welded plate 29-side, the wall portion 33 provided along the opening edge of the recessed portion 32 and formed in such a manner that the distance between the wall portion 33 and the welded plate 29 falls below the distance between the bottom portion 34 and the welded plate 29 and the wall portion 33 does not abut against the welded plate 29, and the protruding portion 30 facing the recessed portion 32 and provided at the welded plate 29 so as to protrude toward the recessed portion 32-side. The protruding portion 30 is configured to allow the magnetic collection ring holder 26 and the welded plate 29 to be welded to each other by being melted with the distal end portion 30a thereof in abutment with the bottom portion 34. The first embodiment further includes the Hall IC sensor 27 configured to detect the angle of the relative rotation between the pinion shaft 4 and the steering shaft 2 by detecting the change in the magnetic field in the pair of magnetic collection rings 24 and 25 that changes due to the relative rotation between the multipole magnet 20 and the pair of magnetic collection rings 24 and 25 that is caused along with the relative rotation between the pinion shaft 4 and the steering shaft 2.

Therefore, the pair of magnetic collection rings 24 and 25 is not subject to the internal stress due to the contraction during the cooling that is caused along with the insert-molding, which can prevent or reduce the distortion of the pair of magnetic collection rings 24 and 25 and improve the detection accuracy of the torque sensor 13.

Further, this configuration allows the burr generated when the magnetic collection ring holder 26 and the welded plate 29 are fixedly welded to each other to be contained in the recessed portion 32 surrounded by the wall portion 33, thereby preventing or reducing the drop of the burr off from the magnetic collection ring assembly.

(10) The welded plate 29 is provided in such a manner that the distance between the bottom portion 34 and the welded plate 29 is set so as to allow the protruding portion 30 or the part of the bottom portion 34 which is melted when the magnetic collection ring holder 26 and the welded plate 29 are fixedly welded to each other to be grown as the burr, and the burr to abut against the welded plate 29.

Therefore, the burr is sandwiched between the bottom portion 34 and the welded plate 29, which can prevent or reduce the clattering (the displacement) of the burr in the recessed portion 32.

(11) The magnetic collection ring holder 26 and the welded plate 29 are each formed into the annular shape or the arc shape so as to surround the rotational axis O. Assuming that the radial direction is the radial direction of the rotational axis O and the circumferential direction is the direction around the rotational axis O, the recessed portion 32 and the protruding portion 30 each include the portion extending from the inner side toward the outer side in the radial direction (the radially-extending recessed portion 32a and the radially-extending protruding portion 302) and the portion extending in the circumferential direction (the circumferentially-extending recessed portion 32b and the circumferentially-extending protruding portion 303).

Therefore, the melted length can increase in the orthogonal directions compared to the provision of the welded portion in only one of the radial direction and the circumferential direction, which can enhance the welding strength.

(12) The portion of the recessed portion 32 that extends in the circumferential direction is formed in such a manner that the width thereof in the radial direction falls below half the width to the inner circumferential edge of the arc wall portion 266 of the magnetic collection ring holder 26.

Therefore, the width of the recessed portion 32 in the radial direction can be prevented from becoming larger than necessary, which can prevent or reduce the clattering of the burr in the recessed portion 32.

(13) The wall portion 33 includes the inclined portion 35 inclined in such a manner that the opening area is increasing from the bottom portion 34 toward the opening edge-side.

Therefore, both the securement of the strength of the wall portion 33 and the securement of the volume of the recessed portion 32 can be achieved at the same time.

(14) The bottom portion 34 is shaped like the flat surface. Assuming that a reference axis line is the direction orthogonal to the flat surface of the bottom portion 34, the protruding portion 30 is formed so as to protrude along the direction of the reference axis line, and includes the proportionally melted portion 30b formed in such a manner that the cross-sectional area thereof in the direction orthogonal to the reference axis line is kept generally constant within the predetermined range in the direction of the reference axis line before the protruding portion 30 is melted.

Therefore, the first embodiment can reduce the generation amount of the burr and also facilitate the management of the generation amount of the burr. Further, the first embodiment can allow the protruding portion to be welded with even welding strength, and prevent or reduce insufficient welding.

(15) The first embodiment includes the steering mechanism 9 including the steering shaft 2 rotatable according to the rotation of the steering wheel 1 and the pinion shaft 4 connected to the steering shaft 2 via the torsion bar 3 and configured to transmit the steering operation performed on the steering wheel 1 to the turning target wheels 8 and 8, the gear box housing 17 rotatably holding the steering shaft 2 and the pinion shaft 4, the multipole magnet 20 provided at the pinion shaft 4 and configured in such a manner that the N pole and the S pole are disposed alternately around the rotational axis O, the pair of magnetic collection rings 24 and 25 provided so as to face the multipole magnet 20 and each made from the magnetic material, and the holding member fixed to the steering shaft 2 and including the magnetic collection ring holder 26 and the welded plate 29 each made from the thermoplastic resin material. The holding member is configured to hold the pair of magnetic collection rings 24 and 25 so as to prevent a contact between the pair of magnetic collection rings 24 and 25 and the steering shaft 2 by the magnetic collection ring holder 26 and the welded plate 29 fixedly welded to each other with the pair of magnetic collection rings 24 and 25 sandwiched between the magnetic collection ring holder 26 and the welded plate 29. The first embodiment further includes the recessed portion 32 provided on one side of the magnetic collection ring holder 26 that faces the welded plate 29, formed so as to be opened to the welded plate 29-side, and including the bottom portion 34, the wall portion 33 provided along the opening edge of the recessed portion 32 and formed in such a manner that the distance between the wall portion 33 and the welded plate 29 falls below the distance between the bottom portion 34 and the welded plate 29 and the wall portion 33 does not abut against the welded plate 29, and the protruding portion 30 facing the recessed portion 32 and provided at the welded plate 29 so as to protrude toward the recessed portion 32-side. The protruding portion 30 is configured to allow the magnetic collection ring holder 26 and the welded plate 29 to be welded to each other by being melted with the distal end portion 30a thereof in abutment with the bottom portion 34. The first embodiment further includes the Hall IC sensor 27 configured to detect the angle of the relative rotation between the pinion shaft 4 and the steering shaft 2 by detecting the change in the magnetic field in the pair of magnetic collection rings 24 and 25 that changes due to the relative rotation between the multipole magnet 20 and the pair of magnetic collection rings 24 and 25 that is caused along with the relative rotation between the pinion shaft 4 and the steering shaft 2, the electric motor 10 configured to supply the steering assist force to the steering mechanism 9, and the motor control circuit 15 configured to calculate the instruction signal directed to the electric motor 10 based on the torque generated between the steering shaft 2 and the pinion shaft 4 that is acquired from the signal output from the Hall IC sensor 27, and output the instruction signal to the electric motor 10.

Therefore, the pair of magnetic collection rings 24 and 25 is not subject to the internal stress due to the contraction during the cooling that is caused along with the insert-molding, which can prevent or reduce the distortion of the pair of magnetic collection rings 24 and 25 and improve the detection accuracy of the torque sensor 13.

Further, this configuration allows the burr generated when the magnetic collection ring holder 26 and the welded plate 29 are fixedly welded to each other to be contained in the recessed portion 32 surrounded by the wall portion 33, thereby preventing or reducing the drop of the burr off from the magnetic collection ring assembly.

(16) The detection member includes the first magnetic collection ring 24 provided between the first annular portion 212 and the second annular portion 222 in the radial direction and formed into the arc shape around the rotational axis O, and the second magnetic collection ring 25 provided between the first magnetic collection ring 24 and the second annular portion 222 in the radial direction and formed into the arc shape around the rotational axis O. The magnetic collection ring holder 26 and the welded plate 29 are the members that sandwich the first magnetic collection ring 24 and the second magnetic collection ring 25 therebetween. The Hall IC sensor 27 is the Hall element that is provided between the first magnetic collection ring 24 and the second magnetic collection ring 25 in the radial direction, and detects the change in the magnetic field between the first magnetic collection ring 24 and the second magnetic collection ring 25.

Therefore, the same structure as the yoke assembly can also be used for the magnetic collection ring assembly.

Other Embodiments

Having described the embodiment for embodying the present invention based on the example thereof, the specific configuration of the present invention is not limited to the configuration described in the exemplary embodiment, and the present invention also includes a design modification and the like thereof made within a range that does not depart from the spirit of the present invention.

For example, the exemplary embodiment has been described referring to the example in which the present invention is applied to the torque sensor, but the present invention is also applicable to a rotational sensor. In this case, the second member is provided at the housing.

Further, regarding the number of poles of the magnetic member, the present invention can be realized as long as there is one or more pole(s) for each of the N pole and the S pole.

The wall portion does not necessarily have to surround the whole circumference of the recessed portion, and may be configured in a different manner as long as the wall portion is provided to cover a predetermined range of the opening edge of the recessed portion to exert the effect of preventing or reducing the drop of the burr. Further, the individual components described in the claims and the specification can be arbitrarily combined or omitted within a range that allows them to remain capable of achieving at least a part of the above-described objects or producing at least a part of the above-described advantageous effects.

The present application claims priority to Japanese Patent Application No. 2014-141097 filed on Jul. 9, 2014. The entire disclosure of Japanese Patent Application No. 2014-141097 filed on Jul. 9, 2014 including the specification, the claims, the drawings, and the summary is incorporated herein by reference in its entirety.

REFERENCE SIGNS LIST 1 steering wheel
2 steering shaft (second member or input shaft)
3 torsion bar
4 pinion shaft (first member or output shaft)
8 turning target wheel
9 steering mechanism
10 electric motor
15 motor control circuit
17 gear box housing (housing)
20 multipole magnet (magnetic member)
21 first yoke (detection member)
22 second yoke (detection member)
23 yoke holder (holding member)
24 first magnetic collection ring (detection member)
25 second magnetic collection ring (detection member)
26 magnetic collection ring holder (holding member)
27 Hall IC sensor (magnetic sensor)
29 welded plate (holding member)
30 protruding portion
32 recessed portion
33 wall portion
34 bottom portion
236 recessed portion
237 wall portion
238 bottom portion

The invention claimed is:

1. A rotational angle detection apparatus comprising:
a first member and a second member provided rotatably relative to each other around a rotational axis;
a magnetic member provided at the first member and configured in such a manner that an N pole and an S pole are disposed adjacent to each other around the rotational axis;
a detection member provided so as to face the magnetic member and made from a magnetic material;
a holding member fixed to the second member and including a first holding member and a second holding member each made from a thermoplastic resin material, the holding member being configured to hold the detection member so as to prevent a contact between the detection member and the second member by the first holding member and the second holding member fixedly welded to each other with the detection member sandwiched between the first holding member and the second holding member;
a recessed portion provided on one side of the first holding member that faces the second holding member, and formed so as to be opened to a second holding member-side, the recessed portion including a bottom portion;
a wall portion provided along an opening edge of the recessed portion and formed in such a manner that a distance between the wall portion and the second holding member falls below a distance between the bottom portion and the second holding member, and the wall portion does not abut against the second holding member;
a protruding portion facing the recessed portion and provided at the second holding member so as to protrude toward a recessed portion-side, the protruding portion being configured to allow the first holding member and the second holding member to be welded to each other by being melted with a distal end portion thereof in abutment with the bottom portion; and
a magnetic sensor configured to detect an angle of a relative rotation between the first member and the second member by detecting a change in a magnetic field in the detection member that changes due to a relative rotation between the magnetic member and the detection member that is caused along with the relative rotation between the first member and the second member.

2. The rotational angle detection apparatus according to claim 1, wherein the second holding member is provided in such a manner that the distance between the bottom portion and the second holding member is set so as to allow the protruding portion or a part of the bottom portion which is melted when the first holding member and the second holding member are fixedly welded to each other to be grown as a burr, and the burr to abut against the second holding member.

3. The rotational angle detection apparatus according to claim 1, wherein the first holding member and the second holding member are each formed into an annular shape or an arc shape so as to surround the rotational axis, and
wherein, assuming that a radial direction is a radial direction of the rotational axis and a circumferential direction is a direction around the rotational axis, the recessed portion and the protruding portion include a portion extending from an inner side toward an outer side in the radial direction and a portion extending in the circumferential direction.

4. The rotational angle detection apparatus according to claim 3, wherein the portion of the recessed portion that extends in the circumferential direction is formed in such a manner that a width thereof in the radial direction falls below half a width of the first holding member in the radial direction.

5. The rotational angle detection apparatus according to claim 1, wherein the wall portion includes an inclined portion inclined in such a manner that an opening area is increasing from the bottom portion toward an opening edge-side.

6. The rotational angle detection apparatus according to claim 1, wherein the bottom portion is shaped as a flat surface, and wherein, assuming that a reference axis line is a direction orthogonal to the flat surface of the bottom portion, the protruding portion is formed so as to protrude along a direction of the reference axis line, and includes a proportionally melted portion formed in such a manner that a cross-sectional area thereof in a direction orthogonal to the reference axis line is kept generally constant within a range in the direction of the reference axis line before the protruding portion is melted.

7. The rotational angle detection apparatus according to claim 1, wherein the detection member includes a first yoke member and a second yoke member, wherein the first yoke member includes first claw portions that are a plurality of plate-like members disposed so as to be positioned concentrically with the rotational axis and face the magnetic member, and a first cylindrical portion formed cylindrically and connecting the first claw portions to each other, wherein the second yoke member includes second claw portions that are a plurality of plate-like members disposed so as to be positioned concentrically with the rotational axis and face the magnetic member, and a second cylindrical portion formed cylindrically and connecting the second claw portions to each other, the second claw portions being each disposed so as to be lined alternately between individual ones of the first claw portions, the second cylindrical portion being disposed so as to be positioned on an inner peripheral side of the first cylindrical portion and spaced apart from each other in a radial direction, wherein the magnetic sensor includes a Hall element configured to detect the magnetic field changing along with a change in a relative angle between the magnetic member and the first and second claw portions that is caused due to the relative rotation between the first member and the second member, wherein the first holding member includes an insertion hole in which each of the first claw portions and the second claw portions is inserted, and wherein the second holding member is fixedly welded to the first holding member while sandwiching the first yoke member and the second yoke member together with the first holding member with the first claw portions and the second claw portions each inserted in the insertion hole of the first holding member.

8. A power steering apparatus comprising:

a steering mechanism including an input shaft rotatable according to a rotation of a steering wheel and an output shaft connected to the input shaft via a torsion bar, the steering mechanism being configured to transmit a steering operation performed on the steering wheel to a turning target wheel;

a housing rotatably holding the input shaft and the output shaft;

a magnetic member provided at the output shaft and configured in such a manner that an N pole and an S pole are disposed adjacent to each other around the rotational axis;

a detection member provided so as to face the magnetic member and made from a magnetic material;

a holding member fixed to the input shaft and including a first holding member and a second holding member each made from a thermoplastic resin material, the holding member being configured to hold the detection member so as to prevent a contact between the detection member and the second member by the first holding member and the second holding member fixedly welded to each other with the detection member sandwiched between the first holding member and the second holding member;

a recessed portion provided on one side of the first holding member that faces the second holding member, and formed so as to be opened to a second holding member-side, the recessed portion including a bottom portion;

a wall portion provided along an opening edge of the recessed portion and formed in such a manner that a distance between the wall portion and the second holding member falls below a distance between the bottom portion and the second holding member, and the wall portion does not abut against the second holding member;

a protruding portion facing the recessed portion and provided at the second holding member so as to protrude toward a recessed portion-side, the protruding portion being configured to allow the first holding member and the second holding member to be welded to each other by being melted with a distal end portion thereof in abutment with the bottom portion; and a magnetic sensor configured to detect an angle of a relative rotation between the input shaft and the output shaft by detecting a change in a magnetic field in the detection member that changes due to a relative rotation between the magnetic member and the detection member that is caused along with the relative rotation between the first member and the second member;

an electric motor configured to supply a steering assist force to the steering mechanism; and a motor control circuit configured to calculate an instruction signal directed to the electric motor based on a torque generated between the input shaft and the output shaft that is acquired from a signal output from the magnetic sensor, and output the instruction signal to the electric motor.

9. The power steering apparatus according to claim 8, wherein, assuming that a radial direction is a radial direction of the rotational axis and a circumferential direction is a direction around the rotational axis, the detection member includes a first yoke member and a second yoke member, the first yoke member including a first annular portion formed annularly so as to surround the rotational axis, and first claw portions that are a plurality of plate-like members, the first claw portions being prepared as a plurality of members so as to be arranged while being spaced apart from each other in the circumferential direction of the first annular portion, the first claw portions each including a first bent portion extending from the first annular portion inwardly in the radial direction, and a first detection portion extending from the first bent portion along a direction of the rotational axis so as to face the magnetic member, the second yoke member including an annularly formed second annular portion disposed on an inner side in the radial direction with respect to the first annular portion and provided so as to be spaced apart from the first annular portion, and second claw portions that are a plurality of plate-like members, the second claw portions being prepared as a plurality of members so as to be arranged while being spaced apart from each other in the circumferential direction of the second annular portion, the second claw portions each including a second bent portion extending from the second annular portion outwardly in the radial direction, and a second detection portion extending from the second bent portion so as to face the magnetic member along the direction of the rotational axis, the second detection portions being each disposed so as to be lined alternately between the individual first detection portions, the first detection portion and the second detection portion being disposed on a same circle centered at the rotational axis, wherein the first holding member includes
  a main body portion including a mounting surface that is a flat surface generally orthogonal to the rotational axis,
  a first through-hole formed so as to allow the first detection portion to penetrate through the mounting surface,
  a first containing portion provided so as to extend continuously from the first through-hole outwardly in the radial direction, the first containing portion being formed into a recessed shape so as to be opened to a mounting surface-side, and configured to contain the first bent portion therein,
  a second through-hole formed so as to allow the second detection portion to penetrate through the mounting surface, and
  a second containing portion provided so as to extend continuously from the second through-hole inwardly in the radial direction, the second containing portion being formed into a recessed shape so as to be opened to the mounting surface-side, and configured to contain the second bent portion therein, and wherein the recessed portion includes an inner diameter side portion formed on the inner side in the radial direction with respect to the first through-hole, and a radially extending portion provided so as to extend through between the first through-hole and the second through-hole from the inner diameter side portion outwardly in the radial direction.

10. The power steering apparatus according to claim 9, further comprising:
  a first magnetic collection ring made from a magnetic material and provided so as to face the first annular portion;
  a second magnetic collection ring made from a magnetic material and provided so as to face the second annular portion and the first magnetic collection ring;
  a third holding member made from thermoplastic resin;
  a fourth holding member made from thermoplastic resin, and configured to fix the first magnetic collection ring and the second magnetic collection ring by being fixedly welded to the third holding member while sandwiching the first magnetic collection ring and the second magnetic collection ring together with the third holding member;
  a second recessed portion provided on one side of the third holding member that faces the fourth holding member and formed so as to be opened to a fourth holding member-side, the second recessed portion including a second bottom portion;
  a second wall portion provided along an opening edge of the second recessed portion and formed in such a manner that a distance between the second wall portion and the fourth holding member falls below a distance between the second bottom portion and the fourth holding member and the second wall does not abut against the fourth holding member; and
  a second protruding portion provided at the fourth holding member so as to face the second recessed portion and protrude toward a second recessed portion-side, the second protruding portion being configured to allow the third holding member and the fourth holding member to be welded to each other by being melted with a distal end portion thereof in abutment with the second bottom portion,
  wherein the magnetic sensor is disposed between the first magnetic collection ring and the second magnetic collection ring, and detects the angle of the relative rotation between the input shaft and the output shaft by detecting the change in the magnetic field between the first magnetic collection ring and the second magnetic collection ring.

11. The power steering apparatus according to claim 9, wherein the second holding member is provided in such a manner that the distance between the bottom portion and the second holding member is set so as to allow the protruding portion or a part of the bottom portion which is melted when the first holding member and the second holding member are fixedly welded to each other to be grown as a burr, and the burr to abut against the second holding member.

12. The power steering apparatus according to claim 9, wherein the first holding member and the second holding member are each formed into an annular shape or an arc shape so as to surround the rotational axis, and
  wherein, assuming that a radial direction is a radial direction of the rotational axis and a circumferential direction is a direction around the rotational axis, the recessed portion and the protruding portion each include a portion extending from an inner side toward an outer side in the radial direction and a portion extending in the circumferential direction.

13. The power steering apparatus according to claim 9, wherein the wall portion includes an inclined portion inclined in such a manner that an opening area is increasing from the bottom portion toward an opening edge-side.

14. The power steering apparatus according to claim 9, wherein the bottom portion is shaped as a flat surface, and
  wherein, assuming that a reference axis line is a direction orthogonal to the flat surface of the bottom portion, the protruding portion is formed so as to protrude along a direction of the reference axis line, and includes a proportionally melted portion formed in such a manner that a cross-sectional area thereof in a direction orthogonal to the reference axis line is kept generally constant within a predetermined range in the direction of the reference axis line before the protruding portion is melted.

15. A fixation structure comprising:
  a holding target member made from a metallic material;
  a holding member made from thermoplastic resin and including a first holding member and a second holding member, the holding member being configured to hold the holding target member by the first holding member and the second holding member fixedly welded to each other with the holding target member sandwiched between the first holding member and the second holding member;

a recessed portion provided on one side of the first holding member that faces the second holding member and formed so as to be opened to a second holding member-side, the recessed portion including a bottom portion;

a wall portion provided along an opening edge of the recessed portion and formed in such a manner that a distance between the wall portion and the second holding member falls below a distance between the bottom portion and the second holding member, and the wall portion does not abut against the second holding member; and a protruding portion facing the recessed portion and provided at the second holding member so as to protrude toward a recessed portion-side, the protruding portion being configured to allow the first holding member and the second holding member to be welded to each other by being melted with a distal end portion thereof in abutment with the bottom portion, wherein the second holding member is provided in such a manner that the distance between the bottom portion and the second holding member is set so as to allow the protruding portion or a part of the bottom portion which is melted when the first holding member and the second holding member are fixedly welded to each other to be grown as a burr, and the burr to abut against the second holding member.

* * * * *